US009581818B2

(12) United States Patent
Suzuki

(10) Patent No.: US 9,581,818 B2
(45) Date of Patent: Feb. 28, 2017

(54) HEAD-MOUNTED DISPLAY OPTICAL SYSTEM AND HEAD-MOUNTED DISPLAY

(71) Applicant: NIKON CORPORATION, Chiyoda-ku, Tokyo (JP)

(72) Inventor: Kenzaburo Suzuki, Yokohama (JP)

(73) Assignee: Nikon Corporation, Tokyo (JP)

( * ) Notice: Subject to any disclaimer, the term of this patent is extended or adjusted under 35 U.S.C. 154(b) by 188 days.

(21) Appl. No.: 14/420,365

(22) PCT Filed: Jul. 23, 2013

(86) PCT No.: PCT/JP2013/004477
§ 371 (c)(1),
(2) Date: Feb. 8, 2015

(87) PCT Pub. No.: WO2014/024403
PCT Pub. Date: Feb. 13, 2014

(65) Prior Publication Data
US 2015/0192775 A1    Jul. 9, 2015

(30) Foreign Application Priority Data
Aug. 8, 2012    (JP) .................................. 2012-175967

(51) Int. Cl.
*G02B 27/01*    (2006.01)
*G02B 13/18*    (2006.01)
(Continued)

(52) U.S. Cl.
CPC ......... *G02B 27/0172* (2013.01); *G02B 13/18* (2013.01); *G02B 17/08* (2013.01);
(Continued)

(58) Field of Classification Search
CPC .. G02B 27/017–27/0179; G02B 23/12–23/125
(Continued)

(56) References Cited

U.S. PATENT DOCUMENTS 5,384,654 A * 1/1995 Iba ........................ G02B 27/017
359/364
5,479,224 A    12/1995 Yasugaki et al.
(Continued)

FOREIGN PATENT DOCUMENTS

JP    6-194598 A    7/1994
JP    8-506429 A    7/1996
(Continued)

OTHER PUBLICATIONS

Extended European search report for European Patent Application No. 13827505.2, Feb. 22, 2016.
(Continued)

*Primary Examiner* — Bumsuk Won
*Assistant Examiner* — Jeffrey Madonna
(74) *Attorney, Agent, or Firm* — Shapiro, Gabor and Rosenberger, PLLC

(57) ABSTRACT

Provided is a head-mounted display optical system (LS) having: an optical deflection element (M1); a first lens group (G1); a second lens group (G2); and an optical reflection element (M2). The head-mounted display optical system is configured such that light from a light source, which is reflected on a reflection surface (M2r) of the optical reflection element (M2) and reaches a drawing surface (I) assumed to be located on a retina when a user wears the head-mounted display, moves on the drawing surface (I) according to the change of a travelling direction of the light caused by the optical deflection element (M1), and an image is drawn on the drawing surface (I). The first lens group (G1) includes a free-shaped surface lens having a free-shaped surface which is rotationally asymmetrical with respect to a reference axis, and the reflection surface (M2r) of the optical reflection element (M2) is formed to be rotationally asymmetrical with respect to a reference axis.

12 Claims, 9 Drawing Sheets

(51) Int. Cl.
*G02B 17/08* (2006.01)
*G02B 26/10* (2006.01)
*G02B 27/42* (2006.01)
*G02B 5/02* (2006.01)
*G02B 27/00* (2006.01)

(52) U.S. Cl.
CPC ....... *G02B 26/105* (2013.01); *G02B 27/0101* (2013.01); *G02B 27/0149* (2013.01); *G02B 27/4211* (2013.01); *G02B 5/0278* (2013.01); *G02B 27/0056* (2013.01); *G02B 2027/011* (2013.01); *G02B 2027/015* (2013.01); *G02B 2027/0145* (2013.01); *G02B 2027/0152* (2013.01)

(58) Field of Classification Search
USPC .............. 359/13–14, 196.1–226.3, 630–633; 349/11, 13
See application file for complete search history.

(56) References Cited

U.S. PATENT DOCUMENTS

| | | | | |
|---|---|---|---|---|
| 5,517,366 | A | 5/1996 | Togino | |
| 6,353,503 | B1* | 3/2002 | Spitzer | G02B 27/0172 359/630 |
| 6,814,442 | B2* | 11/2004 | Okuyama | G02B 3/0006 349/11 |
| 7,446,943 | B2* | 11/2008 | Takagi | G02B 17/004 359/630 |
| 8,511,827 | B2* | 8/2013 | Hua | G02B 13/22 353/20 |
| 2002/0030636 | A1* | 3/2002 | Richards | G02B 27/017 345/8 |
| 2003/0184868 | A1* | 10/2003 | Geist | G02B 27/0176 359/630 |
| 2009/0316115 | A1* | 12/2009 | Itoh | G02B 27/0093 353/20 |
| 2010/0149073 | A1* | 6/2010 | Chaum | G02B 27/0093 345/8 |
| 2011/0102874 | A1 | 5/2011 | Sugiyama et al. | |
| 2013/0329304 | A1* | 12/2013 | Hua | G02B 13/22 359/663 |

FOREIGN PATENT DOCUMENTS

| | | |
|---|---|---|
| JP | 9-83908 A | 3/1997 |
| JP | 10-104548 A | 4/1998 |
| JP | 3382683 B2 | 3/2003 |
| JP | 2009-294606 A | 12/2009 |
| WO | WO 94/18596 A1 | 8/1994 |

OTHER PUBLICATIONS

International Search Report from International Patent Application No. PCT/JP2013/004477, Oct. 22, 2013.
Written Opinion of the International Searching Authority for International Patent Application No. PCT/JP2013/004477, Oct. 22, 2013.

* cited by examiner

HEAD-MOUNTED DISPLAY OPTICAL SYSTEM AND HEAD-MOUNTED DISPLAY

TECHNICAL FIELD

The present invention relates to an optical system used for a head-mounted display.

TECHNICAL BACKGROUND

A plurality of types have been proposed for a head-mounted display (e.g. see Patent Document 1). For example, one conventional head-mounted display is configured to draw an image on a retina by moving light from a light source at high-speed using an optical deflection element, such as a galvano-mirror. In order to improve the optical performance of such a head-mounted display, a number of lenses must be increased and a glass, having a large specific gravity, must be used to sufficiently correct chromatic aberration, which results in an increase in the size and weight of the optical system. This tendency is particularly conspicuous if lens elements, which are used, are all rotationally symmetrical with respect to the reference axis (e.g. spherical lens).

PRIOR ARTS LIST

Patent Document

Patent Document 1: Japanese Patent No. 3382683

SUMMARY OF THE INVENTION

Problems to be Solved by the Invention

In a conventional head-mounted display, it is difficult to implement both decreasing the size and weight and an increase in the optical performance, as mentioned above.

With the foregoing in view, it is an object of the present invention to provide a head-mounted display optical system and a head-mounted display which are compact, light weight and have excellent optical performance.

Means to Solve the Problems

To achieve this object, an aspect of the present invention provides a head-mounted display optical system, having: an optical deflection element that changes a travelling direction of light from a light source; a first lens group that has positive refractive power and collects light entered via the optical deflection element; a second lens group that is disposed near a position of intermediate image forming by the first lens group; and an optical reflection element that has a reflection surface to reflect light transmitted through the second lens group, and allows light, entered from an opposite surface to the reflection surface, to transmit therethrough, this head-mounted display optical system being configured such that light from the light source, which is reflected on the reflection surface and reaches a drawing surface assumed to be located on a retina when a user wears the head-mounted display, moves on the drawing surface in accordance with the change of a travelling direction of the light caused by the optical deflection element, and an image is drawn on the drawing surface, the first lens group includes a free-shaped surface lens having a free-shaped surface which is rotationally asymmetrical with respect to a reference axis, the reflection surface of the optical reflection element is formed to be rotationally asymmetrical with respect to a reference axis, and the following conditional expressions are satisfied.

$$0.20 < m < 3.00$$

$$20 < |f2/f1| < 3000$$

where m denotes an afocal magnification (or a telescope magnification) of the head-mounted display optical system, f1 denotes a focal length of the first lens group, and f2 denotes a focal length of the second lens group.

Another aspect of the present invention provides a head-mounted display including the head-mounted display optical system described above.

Advantageous Effects of the Invention

According to the present invention, a compact, light weight, and excellent optical performance can be implemented.

DESCRIPTION OF THE EMBODIMENTS

Figure 1:
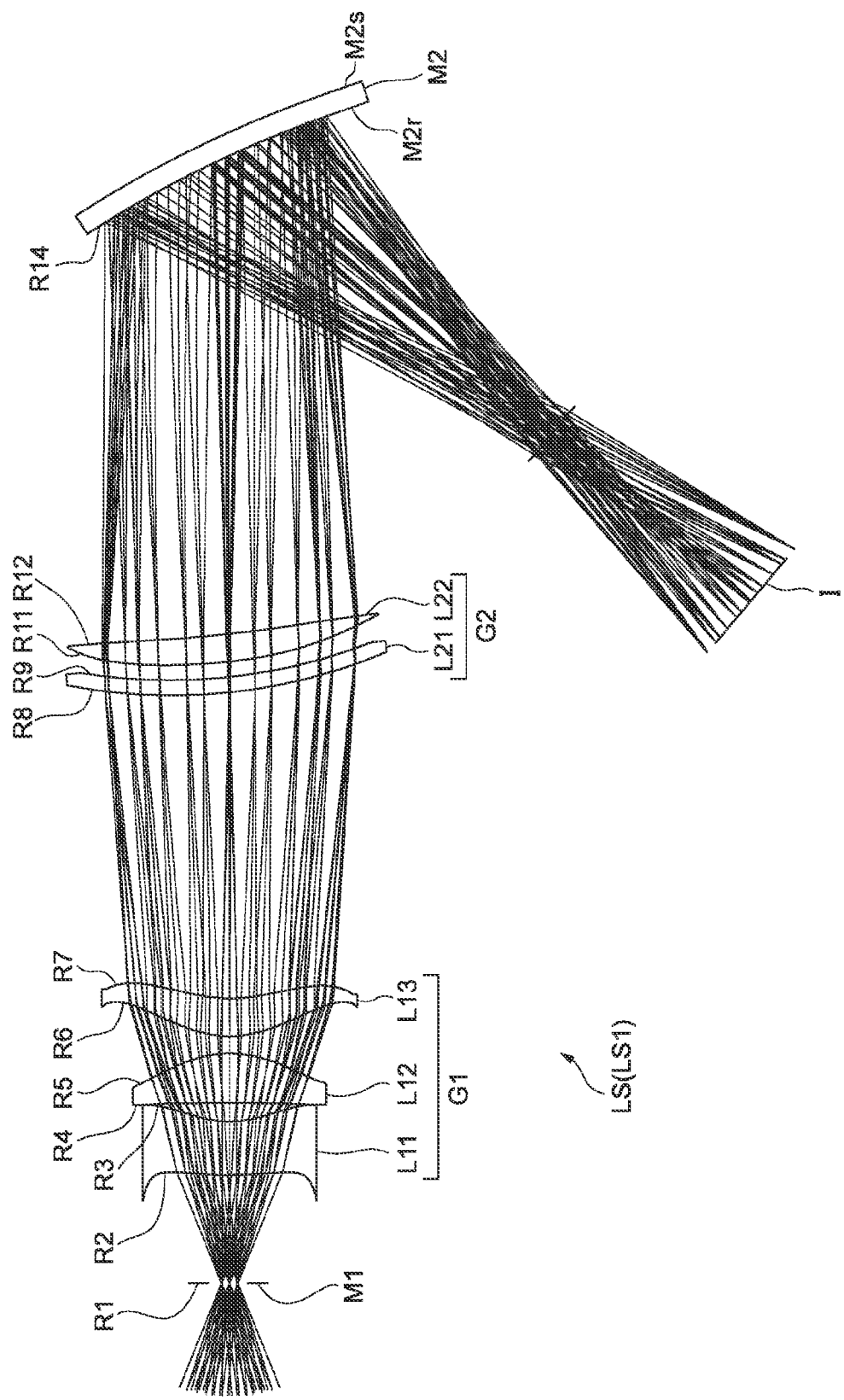
FIG. 1 is an optical path diagram of a head-mounted display optical system according to Example 1.

An embodiment of the present invention will now be described with reference to drawings. For example, a head-mounted display optical system LS according to this embodiment has, in order from a light source: an optical deflection element M1, a first lens group G1 having positive refractive power, a second lens group G2, and an optical reflection element M2 as shown in FIG. 1. The optical deflection element M1 changes the travelling direction of light (e.g. approximately parallel light, such as laser light and LED light) from the light source. For the optical deflection element M1 of this embodiment, a galvano-mirror, for example, is used. Turning the galvano-mirror changes the reflection angle (that is, the travelling direction of the light from the light source) by a degree in accordance with the drive voltage that is inputted from a drive circuit (not illustrated).

The first lens group G1 collects light entered from the light source via the optical deflection element M1. The second lens group G2 is disposed near the position of light collection by the first lens group G1. The optical reflection element M2 has a reflection surface M2r that reflects light transmitted through the second lens group G2. The optical reflection element M2 is also configured to transmit light entered from a surface M2s on the opposite side of this reflection surface M2r. For the optical reflection element M2 of this embodiment, a half mirror, for example, is used.

In this head-mounted display optical system LS, light from the light source, which is reflected on the reflection surface M2r of the optical reflection element M2 and reaches a surface assumed to be located on a retina when a user wears the head-mounted display (hereafter called "drawing surface I"), moves on the drawing surface I as if scanning in a two-dimensional direction in accordance with the change of the traveling direction of the light by the optical deflection element M1. In this case, the image that is drawn is superposed on an image formed by the light that transmitted through the optical reflection element M2 and reached the drawing surface I (retina). Thereby the user can visually recognize the image superposed on an image (external view) formed by the light that transmitted through the optical reflection element M2, when the user wears the head mounted display. The first lens group G1 collects light from the light source, hence an image equivalent to the image drawn on the drawing surface I is formed as an intermediate image at the collection position of the light that transmitted through the first lens group G1, in accordance with the change of the travelling direction of the light from the light source caused by the optical deflection element M1. Hereafter, the position of the intermediate image formed by the first lens group G1 is called "intermediate image forming position". In other words, the second lens group G2 is disposed near the intermediate image forming position by the first lens group G1.

Conventionally, in various optical systems, an aspherical lens has implemented specifications, aberration, performance and compactness, which a spherical lens cannot implement. However if an aspherical lens, which is rotationally symmetrical with respect to a reference axis, is used, the aberration correction effect for an eccentric optical system is insufficient, or an uncorrectable aberration will remain. To solve this problem, lately a free-shaped surface lens, which is rotationally asymmetrical with respect to a reference axis, has started to be used as processing techniques advance.

In this embodiment, the first lens group G1 includes a free-shaped surface lens having a free-shaped surface which is rotationally asymmetrical with respect to a reference axis. Further, the reflection surface Mgr of the optical reflection element M2 is formed to be rotationally asymmetrical with respect to a reference axis. Here the reference axis refers to an axis obtained by tracing (ray tracing) the light that passes through the center of the optical deflection element M1 and reaches the center of the drawing surface I. By using a free-shaped surface which is rotationally asymmetrical with respect to the reference axis, trapezoidal distortion, that is generated by diagonal reflection on the optical reflection element M2, can be effectively corrected. Further, by using the free-shaped surface, the spread of a point image, when the angle of view is large, can be decreased, and resolution can be improved.

Figure 9:
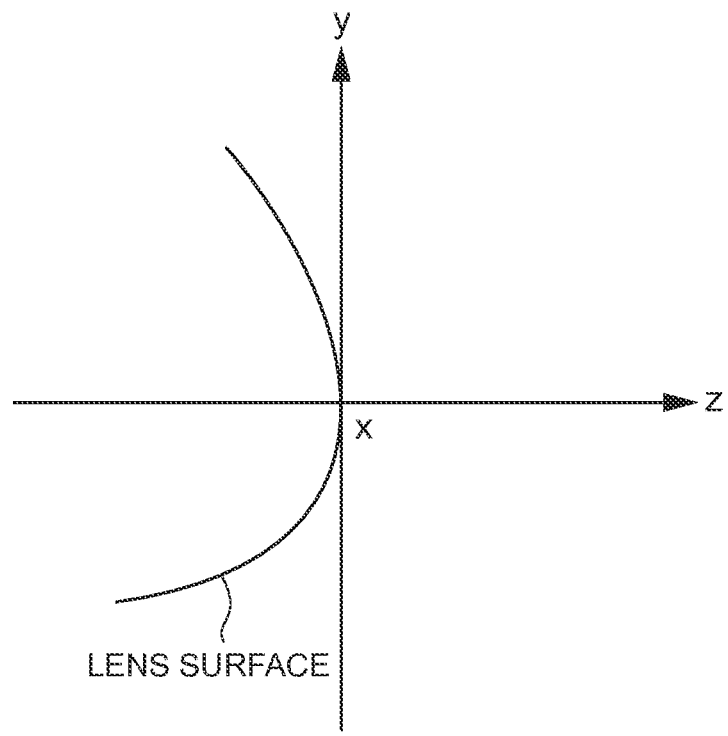
FIG. 9 is a diagram depicting an example of a local coordinate system.

A local coordinate system in the free-shaped surface lens will be described here. In this embodiment, the local coordinate system of the free-shaped surface lens is assumed to be an (x, y, z) coordinate system (right handed system) of which origin is an intersection of the lens surface of the free-shaped surface lens and the reference axis, for example, as shown in FIG. 9. In this case, the z axis is assumed to be the coordinate axis in the reference axis direction where the direction from the optical deflection element M1 to the optical reflection element M2 is positive. The y axis is a coordinate axis that is perpendicular to the z axis in the cross section of the free-shaped surface lens that passes through the reference axis between the optical deflection element M1 and the optical reflection element M2, and the reference axis between the optical reflection element M2 and the drawing surface I. The x axis is a coordinate axis that is perpendicular to the z axis and the y axis. In this case, the (x, y) coordinate system becomes a coordinate system that passes through the intersection between the lens surface of the free-shaped surface lens and the reference axis, and is on the plane that is perpendicular to the reference axis.

In the head-mounted display optical system LS of this embodiment, it is preferable that the following conditional expression (1) is satisfied.

$$0.20 < m < 3.00 \tag{1}$$

where m denotes an afocal magnification of the head-mounted display optical system LS.

The conditional expression (1) specifies an appropriate range of an afocal magnification. In this embodiment, the afocal magnification is an absolute value of a ratio of the focal length between an optical system on the front side (light source side) and an optical system on the rear side (drawing surface I side) of the intermediate image forming position. After the parallel light passes through the optical systems before and after the intermediate image forming position, the optical system LS need not be perfectly afocal (the object point is ∞). Taking the adjusting capability of human eyes and optical devices into account, the optical system LS can be regarded as approximately afocal, if the object image formed by the luminous flux that enters the pupils is further than ±2 [m] (±0.5 [m$^{-1}$]). If the upper limit value of the conditional expression (1) is exceeded, distortion and chromatic aberration in the peripheral area of the screen increase, and image quality drops. Further, curvature of image field in the peripheral area of the screen increases, and sharpness tends to drop. If the lower limit value of the conditional expression (1) is not reached, the afocal magnification becomes too small, hence the image superposed on the external view becomes too small and becomes difficult to see. To secure sufficient pixels and resolution, a large deflection angle of the optical deflection element must be taken, which is not advantageous for the system configuration.

To demonstrate the effect of this embodiment with certainty, it is preferable that the upper limit value of the conditional expression (1) is 2.00. To demonstrate the effect of this embodiment with certainty, it is preferable that the lower limit value of the conditional expression (1) is 0.35.

In the head-mounted display optical system LS of this embodiment, it is preferable that the following conditional expression (2) is satisfied.

$$20 < |f2/f1| < 3000 \tag{2}$$

where f1 denotes a focal length of the first lens group G1, and f2 denotes a focal length of the second lens group G2.

The conditional expression (2) specifies an appropriate ratio of refractive power between the first lens group G1 and the second lens group G2. If the upper limit value of the conditional expression (2) is exceeded, the refractive power of the diffraction optical surface becomes too small when the diffraction optical surface is used, hence correction of chromatic aberration for short wavelengths tends to be insufficient. Even if the diffraction optical surface is not used, generation of chromatic aberration increases, which diminishes the image quality. In particular, the coloring of the edge of an image increases. If the lower limit value of the conditional expression (2) is not reached, the refractive power of the diffraction optical surface becomes too high when the diffraction optical surface is used, hence correction of chromatic aberration for short wavelengths tends to be insufficient. Even if the diffraction optical surface is not used, generation of chromatic aberration increases, which diminishes the image quality. In particular, the coloring of an edge of an image increases. The focal length and refractive power are values acquired by tracing the rays of micro-luminous flux around the optical axis or the reference axis. The values acquired by tracing the rays of micro-luminous flux around the reference axis are a calculated value corresponding to the paraxial ray tracing.

To demonstrate the effect of this embodiment with certainty, it is preferable that the upper limit value of the conditional expression (2) is 2000. To demonstrate the effect of this embodiment with certainty, it is preferable that the lower limit value of the conditional expression (2) is 35.

In the head-mounted display optical system LS of this embodiment, it is preferable that the following conditional expression (3) is satisfied.

$$0.000015 \text{ [mm}^{-1}\text{]} < |1/f2| < 0.005 \text{ [mm}^{-1}\text{]} \quad (3)$$

The conditional expression (3) specifies an appropriate range of the refractive power of the second lens group G2 disposed near the intermediate image forming position. If the upper limit value of the conditional expression (3) is exceeded, the refractive power of the second lens group G2 becomes too high, hence distortion in a peripheral area of the screen tends to be generated and coma aberration is also generated, which drops image quality. If the lower limit value of the conditional expression (3) is not reached, the refractive power of the second lens group G2 becomes too low, hence capability to correct various aberrations (particularly flatness of the image plane) in the peripheral area of the screen becomes insufficient. Further, the refractive power of the second lens group G2 becomes too low, hence it becomes difficult to dispose the pupil position at an optimum location, and correction of coma aberration also becomes difficult.

To demonstrate the effect of this embodiment with certainty, it is preferable that the upper limit value of the conditional expression (3) is 0.003 [mm$^{-1}$]. To demonstrate sufficiently the effect of this embodiment, it is preferable that the lower limit value of the conditional expression (3) is 0.00003 [mm$^{-1}$]. In order to sufficiently separate the pupil position from the semi-transparent reflection mirror (optical reflection element M2) in the configuration, it is preferable that the second lens group G2 has negative refractive power near the reference axis.

In the head-mounted display optical system LS, it is preferable that the following conditional expression (4) is satisfied.

$$15 < \Delta vd < 45 \quad (4)$$

where $\Delta vd$ denotes a maximum value of the difference of Abbe numbers between a lens having positive refractive power and a lens having negative refractive power in the first lens group G1.

The conditional expression (4) specifies an appropriate range of Abbe numbers of a positive lens and a negative lens in the first lens group G1. If the upper limit value of the conditional expression (4) is exceeded, a material having a high refractive index must be used for the negative lens side, which easily diminishes flatness of the image plane. Moreover, a material having a high refractive index tends to have high specific gravity, hence the weight of the entire optical system tends to increase. If the lower limit value of the conditional expression (4) is not reached, the refractive power of each lens becomes too high, and high order aberrations tend to be generated. Further, the curvature of field of the lens surface increases, which makes fabrication difficult.

To demonstrate the effect of this embodiment with certainty, it is preferable that the upper limit value of the conditional expression (4) is 40. To demonstrate the effect of this embodiment with certainty, it is preferable that the lower limit value of the conditional expression (4) is 20.

In the head-mounted display optical system LS of this embodiment, it is preferable that the first lens group G1 is constituted by resin lenses, the second lens group G2 further includes a lens having a diffuse transmission surface, and the deflection angle of light that is reflected on the reflection surface M2r of the optical reflection element M2 (angle formed by the light that enters the reflection surface M2r of the optical reflection element M2 and the light that is reflected by the reflection surface M2r) is 45° or more. The specific gravity of the resin is less than that of glass, so using resin lenses is effective in decreasing the weight of the optical system. Moreover, if the diffuse transmission surface for diffusing the transmitting light is disposed on any one of the lens surfaces of the second lens group G2, the luminous flux diameter after diffusion can be increased, hence the pupil diameter can be increased. Thereby the eye motion area (area which is not eclipsed even when eyes move) can be increased, which is effective in using an HMD (Head-Mounted Display) apparatus as a mobile unit. Micro-bumps to diffuse the transmitting light are formed, for example, on the diffuse transmission surface of the lens having a diffuse transmission surface. Alternatively a diffraction grating that can diffuse the transmitting light, for example, may be formed on the diffuse transmission surface of the lens. To decrease size and weight of the optical system LS, it is preferable that the specific gravity of the resin material is 2.0 or less. To demonstrate the effect even more so, it is preferable that the specific gravity of the resin material is 1.6 or less.

In the head-mounted display optical system LS of this embodiment, it is preferable that the first lens group G1 includes a free-shaped surface lens having positive refractive power and a negative lens, and the second lens group G2 includes a free-shaped surface lens having a free-shaped surface which is rotationally asymmetrical with respect to a reference axis. According to this configuration, complicated distortion that is rotationally asymmetrical with respect to the reference axis can be effectively corrected by the free-shaped surface lens. Further, chromatic aberration can also be corrected by the combination of the positive lens and the negative lens in the first lens group G1.

It is preferable that the free-shaped surface lens of the first lens group G1 has a free-shaped lens surface and an aspherical lens surface, which is located on the opposite side of this lens surface and is rotationally symmetric with respect to the reference axis, and is formed in a meniscus shape, and the negative lens has an aspherical lens surface which is rotationally symmetrical with respect to a reference axis, and is formed in a meniscus shape. Further, the free-shaped surface lens of the second lens group G2 has positive refractive power and is formed in a meniscus shape. By this configuration, an aberration component that is rotationally symmetrical with respect to the reference axis can be effectively corrected.

When (x, y) are the coordinates that pass through the intersection point of the free-shaped lens surface and reference axis, and are on a plane perpendicular to the reference axis, and a sag of the free-shaped lens surface is expressed by a polynomial of x and y in the free-shaped surface lens of the first lens group G1, it is preferable that the polynomial of x and y includes a term of which degree is at least 8. When h is a distance from the reference axis and a sag of the aspherical lens surface is expressed by a polynomial of h in the free-shaped surface lens of the first lens group G1, it is preferable that the polynomial of h includes a term of which degree is at least 8. By this configuration, distortion that is rotationally asymmetrical with respect to the reference axis and an aberration component that is rotationally symmetrical with respect to the reference axis can be effectively corrected.

It is preferable that the second lens group G2 further includes a lens having a diffuse transmission surface, and when (x, y) are coordinates that pass through the intersection point of the free-shaped lens surface and a reference axis, and are on a plane perpendicular to the reference axis, and a sag of the free-shaped lens surface is expressed by a polynomial of x and y in the free-shaped surface lens of the second lens group G2, the polynomial of x and y includes a term of which degree is at least 8. By this configuration, distortion that is rotationally asymmetrical with respect to the reference axis can be effectively corrected. Further, as mentioned above, the luminous flux diameter after diffusion can be increased, hence the pupil diameter can be increased, which is effective in using an HMD apparatus as a mobile unit.

In a refraction optical system and a reflection optical system, various attempts to integrate the diffraction optical surface into the optical system has been made to increase performance and decrease size in a way that conventional methods cannot implement. An example is a pickup lens for an optical disk. However, in the case of a single layer diffraction optical element, more flares are generated in wavelengths that deviated from the design wavelength, which diminishes image quality and image forming performance. The use of a single layer diffraction optical element has been limited to a single wavelength or narrow wavelength region of a laser light source or the like.

Recently however, in a diffraction optical element having such a diffraction optical surface, a diffraction optical element called either a "dual layer type" or a "stacked type" has been proposed. This type of diffraction optical element is constituted by a plurality of diffraction element members having a serrated surface, which are stacked in a separated or contacted state, and has characteristics where high diffraction efficiency is maintained in almost all of a desired wide wavelength region (e.g. visible light region), in other words, wavelength characteristics are good.

Figure 7A:
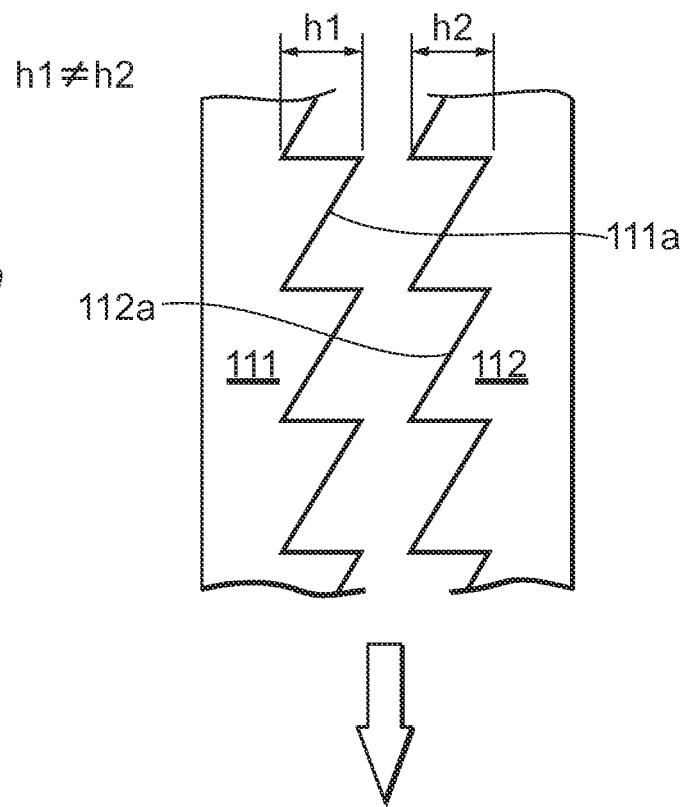
FIG. 7A is a schematic diagram depicting an example of a cross section of a separated dual layer type diffraction optical element.
Figure 7B:
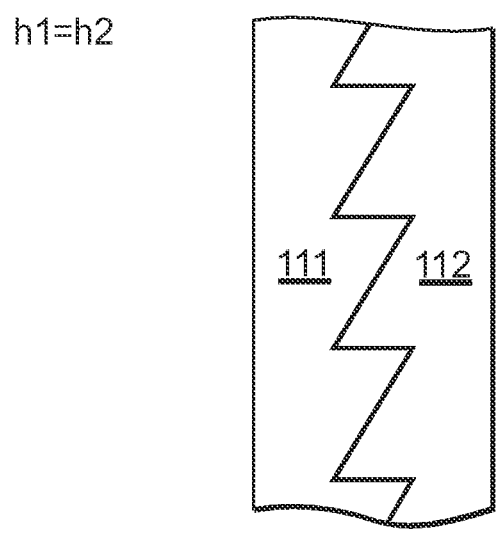
FIG. 7B is a schematic diagram depicting an example of a cross section of a contacted dual layer type diffraction optical element.

Generally dual layer type diffraction optical element is configured by a first optical element member 111 constituted by a first material and a second optical element member 112 constituted by a second material of which refractive index and dispersion value are different from the first material, and serrated diffraction gratings 111a and 112a are formed on the surface of the respective optical element members which face each other, as shown in FIG. 7A and FIG. 7B for example. Here in order to satisfy achromatic conditions for two specific wavelengths, the grating height (height of grooves) h1 of the first optical element member 111 is determined to a predetermined value, and the grating height h2 of the second optical element member 112 is determined to another predetermined value. Thereby the diffraction efficiency is 1.0 for the two specific wavelengths, and very high diffraction efficiency can be obtained even for other wavelengths. By using the dual layer type for the diffraction optical element, the diffraction optical element can be applied to almost all the wavelengths, and can also be easily used even for an imaging lens of a photo camera that uses white light. The diffraction efficiency (diffraction efficiency of the first order diffracted light: first order diffracted light is used in this embodiment) is defined as $\eta$ ($=I_1/I_0$), that is, a ratio of the intensity $I_0$ of the light that enters the diffraction optical element and the intensity $I_1$ of the first order diffracted light included in the light transmitted through the diffraction optical element in the case of the transmission type diffraction optical element.

By satisfying a predetermined condition, a contacted dual layer type diffraction optical element, where the grating height h1 of the first optical element member 111 and the grating height h2 of the second optical element member 112 are matched as shown in FIG. 7B, can be implemented. Compared with the separated dual layer type diffraction optical element shown in FIG. 7A, the contacted dual layer type diffraction optical element has merits in that the error sensitivity (tolerance) of the grating height is relaxed, and the error sensitivity (tolerance) of the surface roughness of the grating surface is also relaxed, which makes fabrication of the diffraction optical element easier, increases mass producibility, and has the advantage of reducing cost of the optical product.

The diffraction optical surface will be further described. Refraction and reflection are known as methods for deflecting a ray, but diffraction is also known as a third method. The diffraction optical element is an optical element that utilizes the diffractive phenomenon of light, and presents behavior that is different from refraction and reflection. For example, a diffraction grating and a Fresnel zone plate are known. Even for a natural light or a white light, an obvious diffraction phenomenon can be generated by the interference of light waves if a structure in a wavelength order is created, since the coherence length is normally several $\lambda$. A surface having such a diffraction effect is called a "diffraction optical surface". A known characteristic of the diffraction optical surface is that if the diffraction optical surface has positive power, the diffraction optical surface presents negative dispersion values, which is very effective to correct chromatic aberration. If the diffraction optical surface has negative power, the diffraction optical surface presents positive dispersion values, which is also very effective to correct chromatic aberration. Therefore chromatic aberration can be corrected very well, which cannot be implemented by ordinary glass, and can be implemented only by expensive special low dispersion glass.

In this embodiment, a surface having a function to deflect a ray, such as a diffraction grating and Fresnel zone plate, is formed on the surface of an optical member constituted by glass or plastic, by applying the diffraction phenomenon, so that good optical performance is obtained by this function. A surface that has a function to deflect a ray using the diffraction phenomenon like this is called a "diffraction optical surface", and an optical element having such a surface is normally called a "diffraction optical element". For details on the diffraction optical element, see "Diffraction Optical Element Primer" (compiled and supervised by the Optical Society of Japan (Japan Society of Applied Physics), expanded and revised edition, 2007).

Generally the smaller the angle of a ray that passes through the diffraction optical surface of an optical system the better. Because if a ray angle increases, flares are more easily generated from the walls or the like of the grating of the diffraction optical surface, which diminishes the image quality. In order to obtain a good image in this optical system with little influence of flares, it is preferable that the ray angle is 30° or less. As long as this condition is satisfied, the diffraction optical surface may be disposed anywhere in the optical system.

By forming the diffraction optical surface, in addition to the free-shaped surface described above, a head-mounted display optical system that is compact and light and has excellent optical performance can be implemented. The refractive power of the first optical element member 111 and the second optical element member 112 may be either positive or negative. The configuration can be designed to be convenient for implementing the specifications and correcting aberrations considering the design requirements. For the diffraction optical element as a whole to have positive refractive power, both the first optical element member 111 and the second optical element member 112 are designed to have positive refractive power, so that the diffraction optical surface has positive refractive power, then the diffraction optical element can have negative dispersion and good achromatism can be implemented in the diffraction optical element as a whole. For the diffraction optical element as a whole to have negative refractive power, on the other hand, both the first optical element member 111 and the second optical element member 112 are designed to have negative refractive power, so that the diffraction optical surface has negative refractive power, then the diffraction optical element can have positive dispersion, and good achromatism can be implemented in the diffraction optical element as a whole.

If the first lens group G1 includes a lens having a diffraction optical surface, it is preferable that the following conditional expression (5) is satisfied.

$$0.01 < fd/f1 < 10.00 \quad (5)$$

where fd denotes a focal length of the lens having the diffraction optical surface, and f1 denotes a focal length of the first lens group G1.

The conditional expression (5) specifies an appropriate ratio between the focal length of the first lens group G1 and the focal length of the lens having a diffraction optical surface. If the upper limit value of the conditional expression (5) is exceeded, fd becomes too large, hence a good aberration balance throughout the screen tends to be lost. Therefore blurring of a point image easily occurs throughout the screen, and correction of chromatic aberration tends to be insufficient. Moreover, refractive power of the other convex lenses in the first lens group G1 becomes too high, which makes it difficult to fabricate the head-mounted display optical system. If the lower limit value of the conditional expression (5) is not reached, fd becomes too small, hence aberration balance is easily lost. Therefore the image forming performance of luminous flux drops, particularly when the angle of view is large, and blurs and color shifts of a point image spread on the image forming surface, and the view near the visual field worsens. Furthermore, if fd becomes small, the radius of curvature of the surface tends to be small, which makes it more difficult to process the diffraction optical surface.

To demonstrate the effect of this embodiment with certainty, it is preferable that the upper limit value of the conditional expression (5) is 6.00. To demonstrate the effect of this embodiment with certainty, it is preferable that the lower limit value of the conditional expression (5) is 0.20.

For an application to enlarge and observe an image generated using a compact display and objective lens, it is preferable that the following conditional expression (6) is satisfied.

$$0.005 \text{ [mm}^{-1}] < dm/(fm)^2 < 1.00 \text{ [mm}^{-1}] \quad (6)$$

where dm denotes a distance from the second lens group G2 to the optical reflection element M2, and fm denotes a focal length of the optical reflection element M2.

The conditional expression (6) specifies an appropriate relationship between eye relief and the focal length when this optical system is applied to an observation optical system. Taking sufficient eye relief is important to construct an observation optical system. If the upper limit value of the conditional expression (6) is exceeded, dm becomes too long, hence the size of the optical system tends to increase. In particular, the optical reflection element M2 becomes too large. Moreover, the curvature of field increases, which makes it impossible to implement good image quality. If the lower limit value of the conditional expression (6) is not reached, dm becomes too short, which results in a decrease in the eye relief. This makes observation difficult when the spectacles are mounted, which makes observation difficult in practical terms. In this embodiment, eye relief refers to a point where the principal ray that passes through the very lower right corner of the mirror of the optical system intersects with the optical axis in the optical path diagram. The shape of a pupil need not be circular, but may be rectangular or elliptical depending on the application and design specification. The shape of a pupil can be created by considering the shape of the lenses and the shape of the diaphragm.

To demonstrate the effect of this embodiment with certainty, it is preferable that the upper limit value of the conditional expression (6) is 0.10 [mm$^{-1}$]. To demonstrate the effect of this embodiment with certainty, it is preferable that the lower limit value of the conditional expression (6) is 0.01 [mm$^{-1}$].

If the first lens group G1 includes a lens having a diffraction optical surface, it is preferable that the following conditional expression (7) is satisfied.

$$0.01 < Ndh - Ndl < 0.45 \quad (7)$$

where Ndh denotes a refractive index of a layer of which refractive index is relatively high in the dual layer type diffraction optical element, and Ndl denotes a refractive index of a layer of which refractive index is relatively low in the dual layer type diffraction optical element.

The conditional expression (7) specifies an appropriate range of the difference of refractive indexes before and after the diffraction optical surface. In the conditional expression (7), a case of blazing spectral lines to which human eyes are highly sensitive, such as the d-line and e-line, by a first order diffracted light, is considered. If the upper limit value of the conditional expression (7) is exceeded, the difference of the refractive indexes become too large, which increases noise light reflected by the interface (diffraction optical surface) and deteriorates image quality. Moreover, the error sensitivity with respect to the grating height increases, which makes processing difficult. If the lower limit value of the conditional expression (7) is not reached, the grating height becomes too high, hence high diffraction efficiency cannot be implemented if the light deviates from vertical entry, and the generation of flares increases, and as a result good image quality cannot be implemented. Processing also becomes difficult.

To demonstrate the effect of this embodiment with certainty, it is preferable that the upper limit value of the conditional expression (7) is 0.20. To demonstrate the effect of this embodiment with certainty, it is preferable that the lower limit value of the conditional expression (7) is 0.02.

If the first lens group G1 includes a lens having a diffraction optical surface, it is preferable that the following conditional expression (8) is satisfied.

$$0.001 < (d1+d2)/f1 < 0.25 \quad (8)$$

where d1 denotes thickness (on the optical axis) of a layer of which refractive index is relatively high in the dual layer type diffraction optical element, d2 denotes thickness (on the optical axis) of a layer of which refractive index is relatively low in the dual layer type diffraction optical element, and f1 denotes focal length of the first lens group G1.

The conditional expression (8) specifies an appropriate range when the sum of d1 and d2 is normalized by f1. If the upper limit value of the conditional expression (8) is exceeded, d1 becomes too large, hence the light absorption on the short wavelength side increases, and transmittance of the entire optical system on the short wavelength side tends to deteriorate. If the lower limit value of the conditional expression (8) is not reached, d1 becomes too small, and molding of the diffraction optical element becomes difficult.

To demonstrate the effect of this embodiment with certainty, it is preferable that the upper limit value of the conditional expression (8) is 0.10. To demonstrate the effect of this embodiment with certainty, it is preferable that the lower limit value of the conditional expression (8) is 0.005.

Thus according to this embodiment, compactness, light weight and excellent optical performance can be implemented.

When the optical system is actually constructed, it is preferable that the following requirements are further satisfied.

The optical member having the free-shaped surface may be constituted by either resin or glass, but is preferably fabricated by a molding method.

In order to maintain good moldability of the contacted dual layer type diffraction optical element and ensure excellent mass producibility, the viscosity (viscosity of uncured material) of material constituting at least one of the first and second diffraction element members is at least 40 [mPa●s]. If 40 [mPa●s] or less, resin easily flows during molding, which makes it difficult to mold a precise shape. The viscosity of material constituting the other diffraction element member, on the other hand, is preferably at least 2000 [mPa●s].

The material of the first and second diffraction element members constituting the diffraction optical element is preferably UV curable resin. This increases production efficiency, which is desirable. In this case, labor time can also be reduced, which leads to cost reduction. To decrease size and weight, it is preferable that the specific gravity of any resin material is 2.0 or less. Resin, of which specific gravity is less compared with glass, is very effective to decrease weight of the optical system. To demonstrate the effect even more, it is preferable that the specific gravity of the resin material is 1.6 or less. Furthermore, it is preferable that the first and second diffraction element members have a refraction surface having positive refractive power at the interface with air, and this refraction surface is aspherical. Suitable resin materials are acrylic, polycarbonate, olefine, acryl-styrene co-polymer, polyester or the like.

It is preferable that the incident angle of all the rays with respect to the diffraction optical surface is 15° or less. If the incident angle increases, generation of flares increases, and image quality drops.

It is also possible to provide a color filter effect by mixing dye with any of the resins constituting each optical member. For example, an infrared cut-off filter may be constructed by this method, whereby a compact imaging optical system is constructed.

The diaphragm may be freely disposed in the optical system, but is preferably constructed such that unwanted rays are cut off and only rays useful for forming an image are transmitted. For example, the lens frame itself may be used as the aperture stop, or a diaphragm may be constructed by a mechanical member at a position distant from the lens. The diaphragm constructed by a mechanical member may be disposed between the lens and the image plane, for example. The shape of the diaphragm is not limited to a circle, but may be an ellipse or rectangle, according to the design specification.

An optical system constituted by a plurality of composing elements incorporating the optical element of this embodiment is within the scope of the present invention. Further, an optical system incorporating a gradient index lens, a crystal material lens or the like is also within the scope of the present invention.

Figure 8:
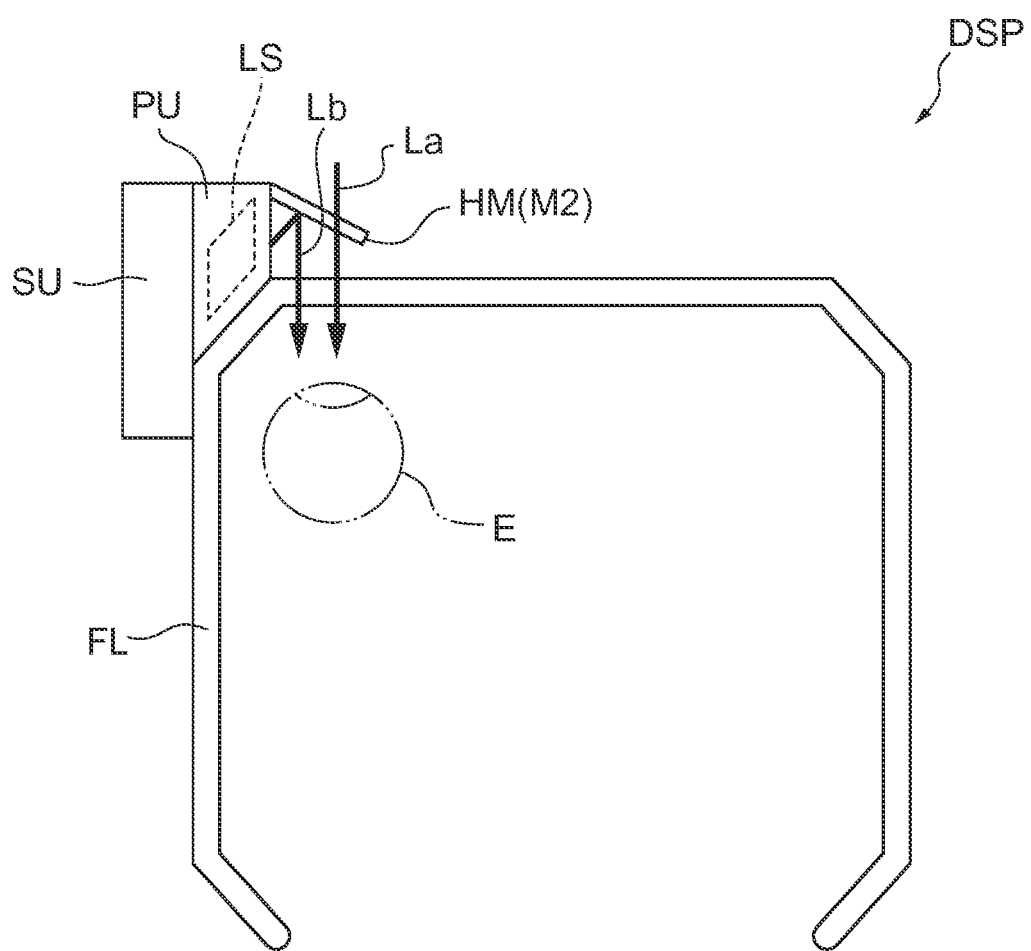
FIG. 8 is a schematic diagram depicting a head-mounted display.

A head-mounted display according to this embodiment will be described next. FIG. 8 shows the head-mounted display DSP according to this embodiment. The head-mounted display DSP includes a spectacle type frame FL, a light source unit SU and a projection unit PU. The spectacle type frame FL holds the light source unit SU and the projection unit PU, and is mounted on the head of the user, along with the light source unit SU and the projection unit PU. The power supply unit SU generates an image signal based on image information inputted from an external input device (not illustrated), and outputs a laser light having intensity in accordance with the image signal (hereafter called "image light") to the projection unit PU.

The projection unit PU two-dimensionally scans the image light emitted from the light source unit SU, and projects the light onto the eyes E of the user. Thereby when the user wears the head-mounted display DSP, the image light is two-dimensionally scanned and an image is projected onto the retina of the eyes E of the user, and the user can visually recognize an image corresponding to the image signal. In the projection unit PU, a half mirror HM is disposed in a location corresponding to the eyes E of the user. An external light La transmits through the half mirror HM and enters the eyes E of the user, and the image light Lb emitted from the projection unit PU is reflected by the half mirror HM and enters the eyes E of the user. As a result, the user can visually recognize the image formed by the image light Lb in a state of being superposed on an outside view formed by the natural light La.

The projection unit PU includes the head-mounted display optical system LS according to the above mentioned embodiment. Therefore compactness, light weight and excellent optical performance can be implemented, as described above. In the head-mounted display DSP according to this embodiment, the half mirror HM corresponds to the optical reflection element M2 of the head-mounted display optical system LS.

EXAMPLES

Example 1

Each example of the present invention will now be described with reference to the accompanying drawings. Example 1 of the present invention will be described first with reference to FIG. 1, FIG. 2 and Table 1. FIG. 1 is an optical path diagram of a head-mounted display optical system LS (LS1) according to Example 1. The head-mounted display optical system LS1 according to Example 1 has, in order from a light source, an optical deflection element M1, a first lens group G1 having positive refractive power, a second lens group G2 having negative refractive power near the reference axis, and an optical reflection element M2. The optical deflection element M1 changes the traveling direction of a light from the light source (e.g. approximately parallel light, such as laser light and LED light). In FIG. 1, the state of change of the traveling direction of light in the optical deflection element M1 is indicated by the light that transmits through a diaphragm (this diaphragm is indicated as the optical deflection element M1) at a plurality of types of incident angles, to simplify description.

The first lens group G1 collects light entered from the light source via the optical deflection element M1. The first lens group G1 includes, in order from the light source, a negative lens L11, a first free-shaped surface lens L12 having positive refractive power, and a second free-shaped surface lens L13 having positive refractive power. The negative lens L11 is formed in a meniscus shape having a convex surface facing the light source. An aspherical surface, which is rotationally symmetrical with respect to the reference axis, is formed on both lens surfaces of the negative lens L11. The first free-shaped surface lens L12 is formed in a meniscus shape having a concave surface facing the light source. An aspherical surface, which is rotationally symmetrical with respect to the reference axis, is formed on the light source side lens surface of the first free-shaped surface lens L12, and a free-shaped surface, which is rotationally asymmetrical with respect to the reference axis, is formed on the drawing surface I side lens surface of the first free-shaped surface lens L12. The second free-shaped surface lens L13 is formed in a meniscus shape having a convex surface facing the light source. An aspherical surface, which is rotationally symmetrical with respect to the reference axis, is formed on the light source side lens surface of the second free-shaped surface lens L13, and a free-shaped surface, which is rotationally asymmetrical with respect to the reference axis, is formed on the drawing surface I side lens surface of the second free-shaped surface lens L13.

The second lens group G2 is disposed near an intermediate image forming position (collecting position) by the first lens group G1. The second lens group G2 includes, in order from the light source, a diffusion lens L21, and a third free-shaped surface lens L22 having positive refractive power. The diffusion lens L21 is formed in a meniscus shape having a convex surface facing the light source. A diffuse transmission surface is formed on the drawing surface I side lens surface of the diffusion lens L21. The third free-shaped surface lens L22 is formed in a meniscus shape having a convex surface facing the light source. A free-shaped surface, which is rotationally asymmetrical with respect to the reference axis, is formed on the light source side lens surface of the third free-shaped surface lens L22, and an aspherical surface, which is rotationally symmetrical with respect to the reference axis, is formed on the drawing surface I side lens surface of the third free-shaped surface lens L22.

The optical reflection element M2 has a reflection surface M2r that reflects light transmitted through the second lens group G2. The optical reflection element M2 is also configured to transmit the light entered from the surface M2s on the opposite side of the reflection surface M2r. The reflection surface M2r of the optical reflection element M2 is formed to be rotationally asymmetrical with respect to the reference axis.

This head-mounted display optical system LS1 is configured such that light from the light source, which is reflected on the reflection surface M2r of the optical reflection element M2 and reached a surface assumed to be located on a retina when the user wears the head-mounted display (drawing surface I), moves on the drawing surface I in a manner of two-dimensionally scanning in accordance with the change of a travelling direction of the light caused by the optical deflection element M1, and an image is drawn on the drawing surface I. In this case, the image that is drawn is superposed on an image formed by the light that is transmitted through the optical reflection element M2 and reached the drawing surface I (retina). In Example 1, it is assumed that an aplanatic lens (not illustrated), of which focal length f=17 [mm], is disposed between the optical reflection element M2 and the drawing surface I. Thereby the light reflected on the reflection surface Mgr of the optical reflection element M2 transmits through the aplanatic lens (not illustrated) and is collected on the drawing surface I (retina).

In each example, the phase difference of the diffraction optical surface is calculated using a phase function method.

A phase polynomial to determine a shape of the diffraction optical surface is given by the following Expression (A).

[Math. 1]

$$Z = \Sigma C_j x^m y^n \tag{A}$$

In Expression (A), the relationship given by the following Expression (B) is established among j, m and n.

[Math. 2]

$$j = \frac{(m+n)^2 + m + 3n}{2} \tag{B}$$

The free-shaped surface is defined by the following expression (C). In Expression (C), Z denotes a sag of a surface in parallel with the reference axis, c denotes a curvature at a vertex of the surface (origin), k denotes a conic constant, h denotes a distance from an origin on the reference axis on a plane that intersects vertically with the reference axis at the origin, and $C_j$ denotes a coefficient of an xy polynomial (polynomial of x and y).

[Math. 3]

$$Z = \frac{ch^2}{1 + \sqrt{1 - (1+k)c^2 h^2}} + \sum C_j x^m y^n \tag{C}$$

Here the relationships given by the following Expressions (D) and (E) are established among j, m and n of Expression (C).

[Math. 4]

$$j = \frac{(m+n)^2 + m + 3n}{2} + 1 \quad (D)$$

[Math. 5]

$$m + n \leq 10 \quad (E)$$

The aspherical surface is defined by the following Expression (F). In Expression (F), Z denotes a sag of a surface in parallel with the reference axis (optical axis), c denotes a curvature at a vertex of the surface (on the reference axis (optical axis)), k denotes a conic constant, and h denotes a distance from the reference axis (optical axis) on a plane that intersects vertically with the reference axis (optical axis), and A4 to A12 are coefficients according to each power series term of h.

[Math. 6]

$$Z = \frac{ch^2}{1 + \sqrt{1 - (1+k)c^2 h^2}} + A4 \times h^4 + A6 \times h^6 + A8 \times h^8 + A10 \times h^{10} + A12 \times h^{12} \quad (F)$$

In each example, each spectral line of C-line, d-line, F-line and g-line is used to calculate the aberration characteristics. The wavelength of each spectral line is as follows.
Wavelength (nm)
C-line 656.273
d-line 587.562
F-line 486.133
g-line 435.835

Table 1 to Table 3 shown below are tables listing various data of the head-mounted display optical system LS according to Examples 1 to 3 respectively. In [Lens Data] in each table, the first column N shows a sequential number of the lens surface counted from the object side, the second column R shows a radius of curvature of the lens surface, the third column D shows the distance between lenses, the fourth column nC shows a refractive index with respect to the C-line, the fifth column nd shows a refractive index with respect to the d-line, the sixth column nF shows a refractive index with respect to the F-line, and the seventh column ng shows a refractive index with respect to the g-line. "*a" attached to the right of the first column indicates that this lens surface is aspherical, "*b" attached to the right of the first column indicates that this lens surface is a free-shaped surface, and "*c" attached to the right of the first column indicates that this lens surface is a diffraction optical surface. "∞" of the radius of curvature indicates a plane, and the refractive index of air is omitted.

In [Eccentricity Data], XDE, YDE and ZDE indicate shift in the x direction, the y direction and the z direction respectively, and ADE, BDE and CDE indicate an inclination (unit: degrees) around the x axis, y axis and z axis respectively. In [Aspherical Data], [Free-shaped surface data] and [Diffraction optical surface data], "E-n" means "×10$^{-n}$". In all the data values herein below, "mm" is normally used as the unit of radius of curvature R, surface distance D and other lengths. However, unit is not limited to "mm", since an equivalent optical performance is obtained even if the optical system is proportionally expanded or proportionally reduced. The same symbols as in this example are also used for various data values of Example 2 and Example 3, which are described later.

Table 1 shows each data value of Example 1. The radius of curvature R of surface 1 to surface 14 in Table 1 correspond to symbols R1 to R14 attached to surface 1 to surface 1 in FIG. 1 (excluding surface 10 and surface 13, which are virtual surfaces).

TABLE 1

| [Lens Data] | | | | | | |
|---|---|---|---|---|---|---|
| N | R | D | nC | nd | nF | ng |
| Object surface | ∞ | ∞ | | | | |
| 1 (aperture stop) | ∞ | 7.0737 | | | | |
| 2*a | 26.1079 | 3.5000 | 1.6074 | 1.6142 | 1.6314 | 1.6463 |
| 3*a | 6.0261 | 1.2000 | | | | |
| 4*a | −139.6362 | 3.2500 | 1.5283 | 1.53113 | 1.53783 | 1.54319 |
| 5*b | −6.6413 | 1.1000 | | | | |
| 6*a | 6.0884 | 2.5000 | 1.5283 | 1.53113 | 1.53783 | 1.54319 |
| 7*b | 7.1934 | 20.0000 | | | | |
| 8 | 36.0000 | 1.0000 | 1.4883 | 1.4908 | 1.4969 | 1.5016 |
| 9 | 36.0000 | 1.0000 | | | | |
| 10 | ∞ | 0.0000 | | | | |
| 11*b | 98.4222 | 1.8000 | 1.4883 | 1.4908 | 1.4969 | 1.5016 |
| 12*a | 82.9218 | 0.0000 | | | | |
| 13 | ∞ | 31.1429 | | | | |
| 14*b (reflection) | −66.0000 | −45.0000 | | | | |
| Image plane (drawing surface) | ∞ | 0.0000 | | | | |

TABLE 1-continued

[Eccentricity Data]

| Eccentricity | Surface 8 | Surface 10 | Surface 11 | Surface 13 | Surface 14 |
|---|---|---|---|---|---|
| XDE | 0.0 | 0.0 | 0.0 | 0.0 | 0.0 |
| YDE | 0.0 | 0.0 | 0.0 | 0.0 | 0.0 |
| ZDE | 0.0 | 0.0 | 0.0 | 0.0 | 0.0 |
| ADE | 6.0 | −6.0 | 6.0 | −6.0 | 25.0 |
| BDE | 0.0 | 0.0 | 0.0 | 0.0 | 0.0 |
| CDE | 0.0 | 0.0 | 0.0 | 0.0 | 0.0 |

[Aspherical Data]

Surface 2 coefficient k = −121.7194695202487
A4 = 0.001204087810046505
A6 = −0.0001388073049376515
A8 = 0.3272747753555764E−5
A10 = 0.8651482588206862E−7
A12 = −0.4577336492603486E−8

Surface 3 coefficient k = −3.899985247951888
A4 = −0.000692579625568129
A6 = −0.736953824073804E−6
A8 = 0.5744863840903909E−7
A10 = −0.1089711828346197E−8
A12 = −0.42714750385595E−10

Surface 4 coefficient k = 500.0
A4 = 0.0001885783788227973
A6 = −0.7290580702481259E−6
A8 = −0.1687839086919377E−6
A10 = −0.3866962063772566E−8
A12 = 0.1672547615430344E−9

Surface 6 coefficient k = −4.103478542047234
A4 = 0.0002580575996569321
A6 = −0.1247180061433354E−4
A8 = 0.1934054239498101E−6
A10 = −0.1851585581105413E−8
A12 = 0.2038231252720517E−11

Surface 12 coefficient k = 0.00001
A4 = −0.2609431778754561E−4
A6 = −0.1879205705223268E−7
A8 = −0.1737233337684116E−10
A10 = 0.4084729769386872E−13
A12 = −0.3965647731154538E−14

[Free-shaped surface data 1]

| Term | Surface 5 coefficient | Surface 7 coefficient |
|---|---|---|
| C1(k) | −0.3017745850875778 | −6.289974218996122 |
| C4(x^2) | 0.003466799143357255 | −0.001298452145258934 |
| C5(x*y) | −0.001115603104928361 | 0.0003822737406034326 |
| C6(y^2) | 0.0070562666856616 | −0.01357172844453788 |
| C7(x^3) | −0.0002593761539094165 | 0.0003967924865306014 |
| C8(x^2*y) | −0.000213250191978018 | −0.001371988100285954 |
| C9(x*y^2) | −0.0006191442572110238 | 0.0006519318827385893 |
| C10(y^3) | −0.0004718785005503118 | 0.0007140652552868351 |
| C11(x^4) | 0.0003098822638427462 | −0.001333147444714297 |
| C12(x^3*y^1) | 0.3407768810806382E−4 | 0.3702664184744909E−4 |
| C13(x^2*y^2) | 0.0006208558182873208 | −0.0001486993056817897 |
| C14(x^1*y^3) | 0.0001792129244483547 | −0.8202377408038175E−4 |
| C15(y^4) | 0.0003580494710146699 | −0.1805720322028896E−5 |
| C16(x^5) | 0.2663050945651949E−4 | −0.3564660331163073E−4 |
| C17(x^4*y) | 0.0001474696025030011 | 0.0002908357809224226 |
| C18(x^3*y^2) | 0.3826719889708307E−4 | −0.5278851232820081E−4 |
| C19(x^2*y^3) | 0.1026510876791286E−4 | −0.1129260388688707E−4 |
| C20(x*y^4) | −0.89755244405221E−5 | −0.3255869135725364E−5 |
| C21(y^5) | −0.881872878453439E−5 | −0.1565166610057392E−4 |
| C22(x^6) | 0.2469668814869958E−4 | 0.0001044613639817373 |
| C23(x^5*y) | −0.9577511038872208E−5 | 0.485644559192588E−5 |

TABLE 1-continued

| | | |
|---|---|---|
| C24(x^4*y^2) | 0.5046560131654857E−4 | −0.4070365124589857E−5 |
| C25(x^3*y^3) | −0.3118417520710068E−5 | −0.1206368572452636E−6 |
| C26(x^2*y^4) | 0.2390039944775742E−4 | −0.8706445825913175E−5 |
| C27(x*y^5) | −0.2021899900909428E−5 | 0.7102202017053954E−6 |
| C28(y^6) | 0.1121912351982155E−4 | −0.3920146580746637E−5 |
| C29(x^7) | 0.3119742444603493E−5 | −0.1022712596352382E−5 |
| C30(x^6*y) | −0.1560107102046973E−4 | −0.2061553131129934E−4 |
| C31(x^5*y^2) | −0.1022165397653761E−6 | 0.2524689087473794E−5 |
| C32(x^4*y^3) | 0.6256105666354908E−6 | 0.1076326368048734E−5 |
| C33(x^3*y^4) | 0.2345864653335014E−6 | 0.6829314149181599E−6 |
| C34(x^2*y^5) | 0.2093443610038782E−5 | −0.817752813267785E−6 |
| C35(x^1*y^6) | 0.483868092159451E−6 | −0.1440162325040492E−6 |
| C36(y^7) | 0.7510694585638476E−6 | 0.146433761705865E−6 |
| C37(x^8) | −0.2467932549368314E−6 | 0.440537048345761E−5 |
| C38(x^7*y^1) | 0.174350235824826E−7 | −0.100773324541987E−7 |
| C39(x^6*y^2) | −0.3030380767038765E−5 | −0.6710754426117793E−6 |
| C40(x^5*y^3) | −0.862388498644196E−6 | −0.953525904808616 8E−7 |
| C41(x^4*y^4) | 0.1114429145219428E−5 | 0.1957221945793596E−6 |
| C42(x^3*y^5) | −0.1311338944233999E−7 | 0.3649699847740186E−7 |
| C43(x^2*y^6) | 0.7673913237103807E−6 | 0.7638710741140231E−7 |
| C44(x^1*y^7) | −0.1022816718413322E−6 | 0.1531614658352089E−7 |
| C45(y^8) | 0.1038023304987815E−6 | 0.4631307996723954E−8 |
| C46(x^9) | −0.2077668320265781E−6 | 0.7659178291049076E−7 |
| C47(x^8*y) | 0.8811215797461278E−6 | 0.4286648225719628E−6 |
| C48(x^7*y^2) | −0.1017463461554473E−6 | −0.4690214684721334E−7 |
| C49(x^6*y^3) | −0.7048883610168791E−6 | 0.9082440518878004E−7 |
| C50(x^5*y^4) | 0.4252785573753692E−7 | −0.16753421062955E−7 |
| C51(x^4*y^5) | 0.1144701685012133E−6 | −0.2319990072526336E−7 |
| C52(x^3*y^6) | −0.3692806162779624E−7 | −0.3301471336612236E−7 |
| C53(x^2*y^7) | −0.5502278825410581E−7 | 0.1239194838045183E−7 |
| C54(x*y^8) | −0.8886779900973679E−9 | 0.181425272749395E−8 |
| C55(y^9) | −0.1400634098335568E−7 | 0.4289199154548536E−10 |
| C56(x^10) | −0.6394953871821582E−7 | 0.9682846367662571E−7 |
| C57(x^9*y) | 0.2540103437709849E−7 | −0.342555825602362E−8 |
| C58(x^8*y^2) | 0.978580552741408E−7 | 0.9438044604115687E−9 |
| C59(x^7*y^3) | 0.1703644781583354E−7 | 0.698764528549666E−11 |
| C60(x^6*y^4) | 0.463820833904626E−7 | 0.1325497883224603E−8 |
| C61(x^5*y^5) | 0.3049088350270744E−7 | 0.9226805612114128E−9 |
| C62(x^4*y^6) | 0.4055561730231605E−7 | −0.446228256709647E−8 |
| C63(x^3*y^7) | 0.2411367852597294E−9 | −0.9391879112780659E−9 |
| C64(x^2*y^8) | −0.1071492894406766E−7 | −0.21236224132437E−8 |
| C65(x^9*y) | 0.1805437183157719E−8 | −0.1460283831938418E−9 |
| C66(y^10) | −0.1848835057183689E−8 | −0.7361519164041878E−10 |

[Free-shaped surfaced data 2]

| Term | Surface 17 coefficient |
|---|---|
| C1(k) | 81.71254939167278 |
| C4(x^2) | 0.00791570619172745 |
| C5(x*y) | 0.001123378770402062 |
| C6(y^2) | 0.009679528636615819 |
| C7(x^3) | −0.226322034107961E−4 |
| C8(x^2*y) | 0.5360693330540352E−4 |
| C9(x*y^2) | −0.1377957183120677E−4 |
| C10(y^3) | −0.0003519578519071908 |
| C11(x^4) | 0.0001075753092625291 |
| C12(x^3*y^1) | −0.4241041725681437E−6 |
| C13(x^2*y^2) | 0.7789536633500974E−4 |
| C14(x^1*y^3) | −0.5062402485802235E−5 |
| C15(y^4) | 0.2409472911968187E−4 |
| C16(x^5) | 0.762063479810465E−6 |
| C17(x^4*y) | −0.7480814903816188E−5 |
| C18(x^3*y^2) | 0.1438089929671677E−5 |
| C19(x^2*y^3) | −0.556591328611352E−5 |
| C20(x*y^4) | −0.7945076353643055E−6 |
| C21(y^5) | −0.1338230016045893E−5 |
| C22(x^6) | 0.2878012125528234E−6 |
| C23(x^5*y) | −0.624022839236557E−6 |
| C24(x^4*y^2) | 0.4599179052765449E−6 |
| C25(x^3*y^3) | 0.2644884073907662E−6 |
| C26(x^2*y^4) | −0.9578696536819849E−8 |
| C27(x*y^5) | −0.2720859549328555E−6 |
| C28(y^6) | −0.849145886566742E−7 |
| C29(x^7) | −0.2734043214198553E−7 |
| C30(x^6*y) | 0.4912163351311643E−8 |
| C31(x^5*y^2) | 0.2018147279015479E−6 |
| C32(x^4*y^3) | 0.5266506284409001E−7 |
| C33(x^3*y^4) | −0.9551172420924838E−7 |
| C34(x^2*y^5) | 0.7127478731636541E−7 |

TABLE 1-continued

| Term | |
|---|---|
| C35(x^1*y^6) | 0.1719394408507042E−7 |
| C36(y^7) | 0.445746144917605E−7 |
| C37(x^8) | −0.3220832302879691E−7 |
| C38(x^7*y^1) | −0.3084425750501727E−7 |
| C39(x^6*y^2) | 0.8346726588083648E−7 |
| C40(x^5*y^3) | 0.1867881673338012E−7 |
| C41(x^4*y^4) | −0.7908158309130722E−7 |
| C42(x^3*y^5) | −0.2537263125823934E−8 |
| C43(x^2*y^6) | −0.7681488722460555E−9 |
| C44(x^1*y^7) | 0.1596511474214415E−8 |
| C45(y^8) | 0.6698019179202518E−9 |

[Free-shaped surface data 3]

| Term | Surface 14 coefficient |
|---|---|
| C1(k) | 3.962964493781687 |
| C4(x^2) | −0.001028153765764826 |
| C5(x*y) | 0.175569482042806E−4 |
| C6(y^2) | 0.001259624894796678 |
| C7(x^3) | −0.5221346423219113E−5 |
| C8(x^2*y) | 0.1861546693528138E−4 |
| C9(x*y^2) | 0.1520365201410679E−4 |
| C10(y^3) | −0.1845501708191367E−4 |
| C11(x^4) | 0.4772526614248559E−4 |
| C12(x^3*y^1) | 0.1044451265574271E−5 |
| C13(x^2*y^2) | −0.122787791899436E−4 |
| C14(x^1*y^3) | −0.1600166184381832E−5 |
| C15(y^4) | −0.7664122368760205E−5 |
| C16(x^5) | 0.1834252350968806E−6 |
| C17(x^4*y) | 0.3122096431780654E−5 |
| C18(x^3*y^2) | −0.2768680465570283E−6 |
| C19(x^2*y^3) | −0.1321919572017405E−5 |
| C20(x*y^4) | −0.147599246363685E−6 |
| C21(y^5) | 0.8156383807089381E−7 |
| C22(x^6) | −0.2611234595310471E−5 |
| C23(x^5*y) | −0.2970252998342986E−7 |
| C24(x^4*y^2) | 0.6158655020171089E−6 |
| C25(x^3*y^3) | 0.7105247483583933E−8 |
| C26(x^2*y^4) | −0.2454274046766187E−8 |
| C27(x*y^5) | 0.9744965415921332E−8 |
| C28(y^6) | 0.1124077125995596E−7 |
| C29(x^7) | −0.1163511506909664E−7 |
| C30(x^6*y) | −0.3028808052213724E−6 |
| C31(x^5*y^2) | 0.1198316702193867E−7 |
| C32(x^4*y^3) | 0.193432647259742E−7 |
| C33(x^3*y^4) | −0.2456697279766292E−8 |
| C34(x^2*y^5) | 0.323741057368371E−7 |
| C35(x^1*y^6) | 0.3355065242253185E−9 |
| C36(y^7) | 0.1488724197468286E−8 |
| C37(x^8) | 0.7147963609945736E−7 |
| C38(x^7*y^1) | −0.3441028882735257E−8 |
| C39(x^6*y^2) | −0.1636702703538912E−7 |
| C40(x^5*y^3) | 0.1892078012001264E−8 |
| C41(x^4*y^4) | 0.8673389748241515E−8 |
| C42(x^3*y^5) | 0.9327542722958507E−10 |
| C43(x^2*y^6) | −0.1808477328812757E−9 |
| C44(x^1*y^7) | 0.1230400754690463E−9 |
| C45(y^8) | 0.7695547891324175E−9 |
| C46(x^9) | 0.2538572458767442E−9 |
| C47(x^8*y) | 0.5596033598779898E−8 |
| C48(x^7*y^2) | 0.8299884465237318E−10 |
| C49(x^6*y^3) | −0.1408407485040278E−8 |
| C50(x^5*y^4) | 0.1026572981410108E−9 |
| C51(x^4*y^5) | 0.2842618728614499E−9 |
| C52(x^3*y^6) | −0.9551906470507542E−10 |
| C53(x^2*y^7) | −0.4050425393925585E−9 |
| C54(x*y^8) | 0.3804279681288634E−10 |
| C55(y^9) | −0.3697621660603705E−10 |
| C56(x^10) | −0.8177789522569431E−9 |
| C57(x^9*y) | 0.812957348690838E−10 |
| C58(x^8*y^2) | 0.3084476996537277E−9 |
| C59(x^7*y^3) | −0.5631426025373504E−10 |
| C60(x^6*y^4) | −0.5305140315017303E−10 |
| C61(x^5*y^5) | −0.5476471825119294E−11 |
| C62(x^4*y^6) | −0.8166445259833216E−10 |
| C63(x^3*y^7) | 0.6976224960109545E−11 |
| C64(x^2*y^8) | 0.3150044437407047E−10 |

TABLE 1-continued

| C65(x^9*y) | −0.5285680302196486E−11 |
|---|---|
| C66(y^10) | −0.199790881969388E−11 |

Figure 2:
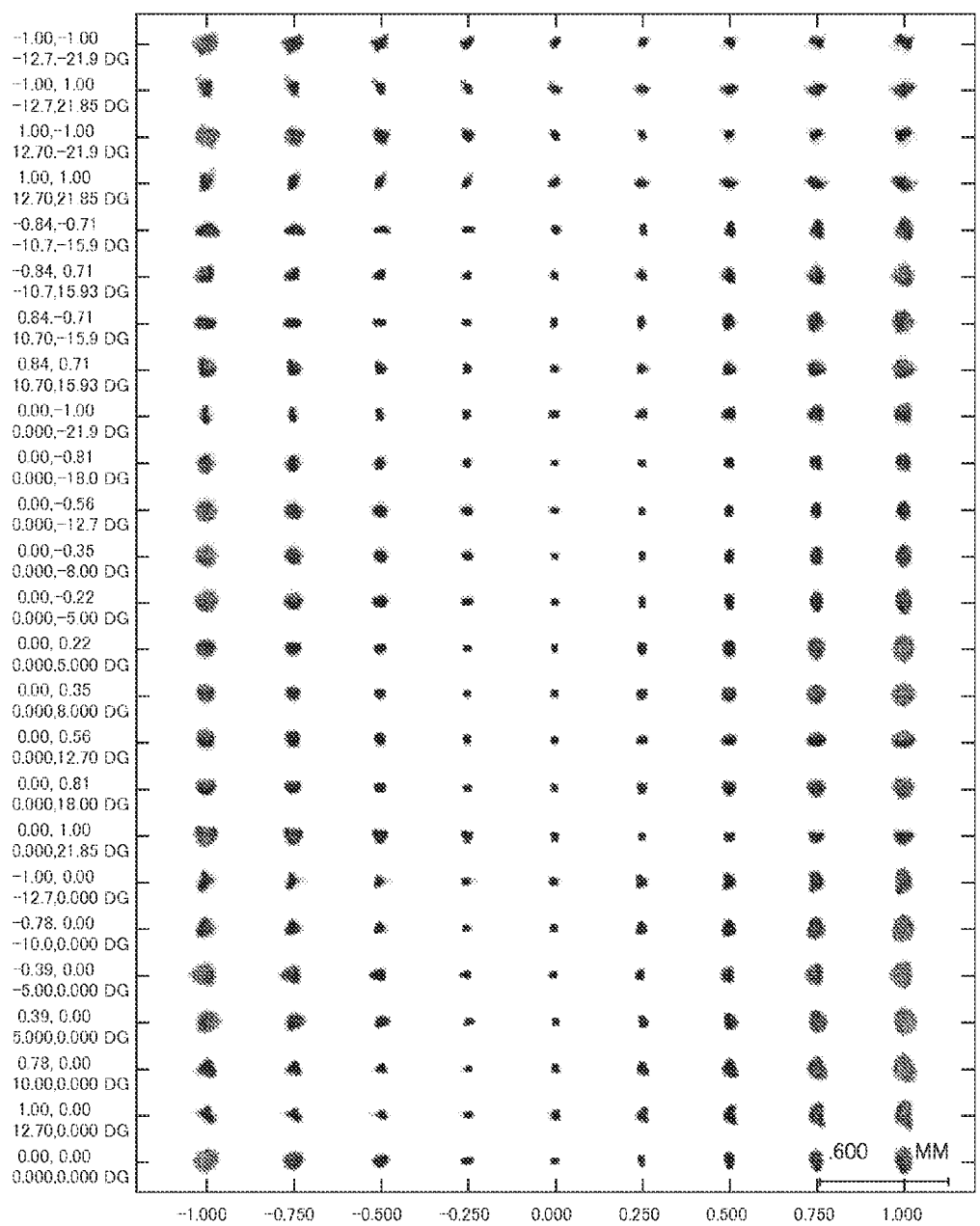
FIG. 2 is a spot diagram of a head-mounted display optical system according to Example 1.

FIG. 2 is a spot diagram of the head-mounted display optical system LS1 according to Example 1. The length of the line indicated at the lower part of the spot diagram corresponds to 0.6 mm on the drawing surface. The ordinate of the spot diagram indicates the field position, and the abscissa of the spot diagram indicates the defocus amount. The description on the spot diagram is the same for other examples herein below, where description thereof is omitted. As FIG. 2 shows, according to Example 1, chromatic aberration is corrected satisfactorily, and excellent image forming performance is demonstrated.

Example 2

Figure 3:
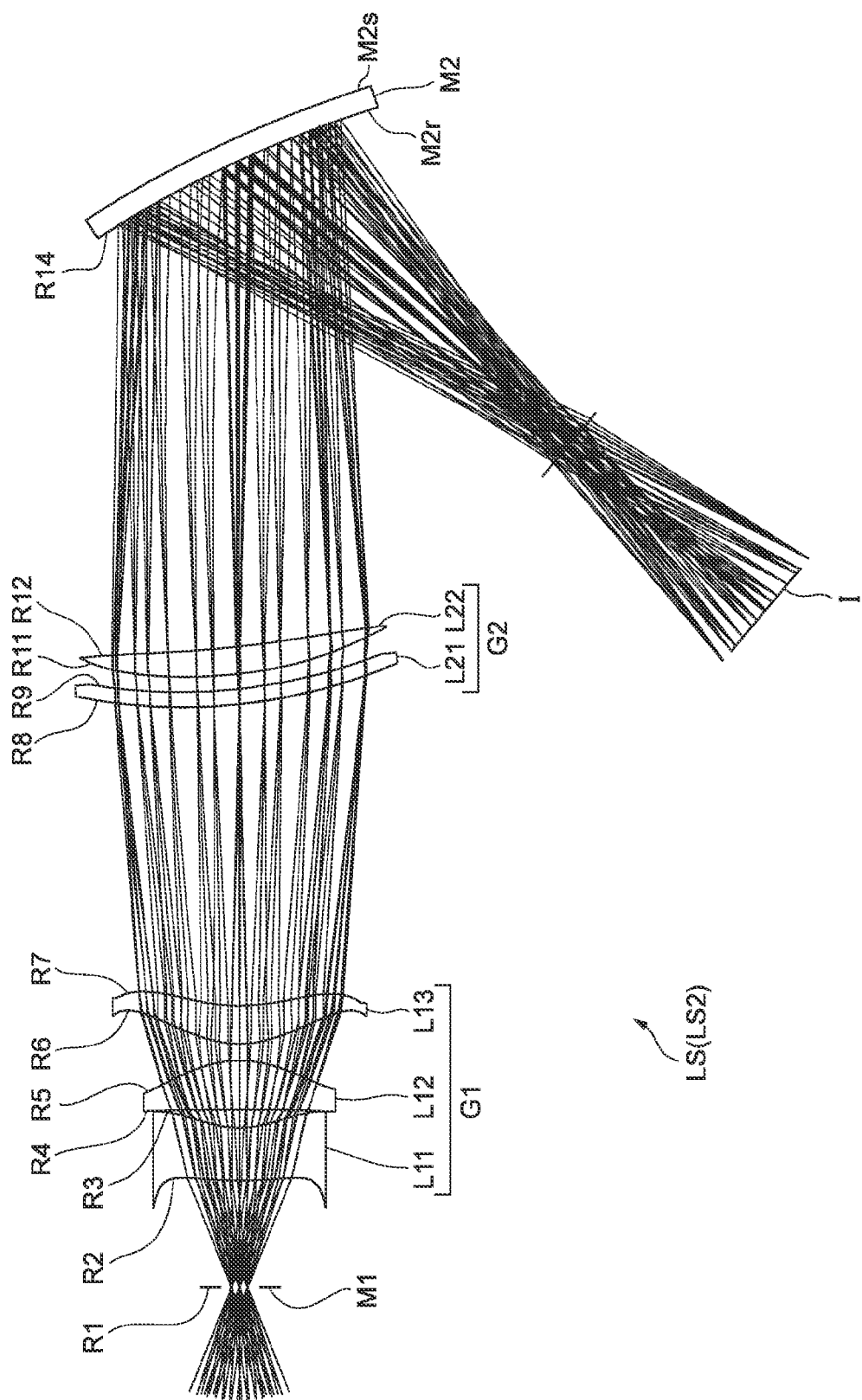
FIG. 3 is an optical path diagram of a head-mounted display optical system according to Example 2.

Example 2 of the present invention will be described next with reference to FIG. 3, FIG. 4 and Table 2. FIG. 3 is an optical path diagram of a head-mounted display optical system LS (LS2) according to Example 2. The head-mounted display optical system LS2 according to Example 2 has, in order from a light source, an optical deflection element M1, a first lens group G1 having positive refractive power, a second lens group G2 having negative refractive power near the reference axis, and an optical reflection element M2. The optical deflection element M1 changes the traveling direction of a light from the light source (e.g. approximately parallel light, such as laser light and LED light). In FIG. 3, the state of change of the traveling direction of light in the optical deflection element M1 is indicated by the light that transmits through a diaphragm (this diaphragm is indicated as the optical deflection element M1) at a plurality of types of incident angles, to simplify description.

The first lens group G1 collects light entered from the light source via the optical deflection element M1. The first lens group G1 includes, in order from the light source, a negative lens L11, a first free-shaped surface lens L12 having positive refractive power, and a second free-shaped surface lens L13 having positive refractive power. The negative lens L11 is formed in a meniscus shape having a convex surface facing the light source. An aspherical surface, which is rotationally symmetrical with respect to the reference axis, is formed on both lens surfaces of the negative lens L11. The first free-shaped surface lens L12 is formed in a meniscus shape having a concave surface facing the light source. An aspherical surface, which is rotationally symmetrical with respect to the reference axis, is formed on the light source side lens surface of the first free-shaped surface lens L12, and a free-shaped surface, which is rotationally asymmetrical with respect to the reference axis, is formed on the drawing surface I side lens surface of the first free-shaped surface lens L12. The second free-shaped surface lens L13 is formed in a meniscus shape having a convex surface facing the light source. A diffraction optical surface on an aspherical surface, which is rotationally symmetrical with respect to the reference axis, is formed on the light source side lens surface of the second free-shaped surface lens L13, and a free-shaped surface, which is rotationally asymmetrical with respect to the reference axis, is formed on the drawing surface I side lens surface of the second free-shaped surface lens L13.

The second lens group G2 is disposed near an intermediate image forming position (collecting position) by the first lens group G1. The second lens group G2 includes, in order from the light source, a diffusion lens L21, and a third free-shaped surface lens L22 having positive refractive power. The diffusion lens L21 is formed in a meniscus shape having a convex surface facing the light source. A diffuse transmission surface is formed on the drawing surface I side lens surface of the diffusion lens L21. The third free-shaped surface lens L22 is formed in a meniscus shape having a convex surface facing the light source. A free-shaped surface, which is rotationally asymmetrical with respect to the reference axis, is formed on the light source side lens surface of the third free-shaped surface lens L22, and an aspherical surface, which is rotationally symmetrical with respect to the reference axis, is formed on the drawing surface I side lens surface of the third free-shaped surface lens L22.

The optical reflection element M2 has a reflection surface M2r that reflects light transmitted through the second lens group G2. The optical reflection element M2 is also configured to transmit the light entered from the surface M2s on the opposite side of the reflection surface M2r. The reflection surface M2r of the optical reflection element M2 is formed to be rotationally asymmetrical with respect to the reference axis.

This head-mounted display optical system LS is configured such that light from the light source, which is reflected on the reflection surface M2r of the optical reflection element M2 and reaches a surface assumed to be located on a retina when the user wears the head-mounted display (drawing surface I), moves on the drawing surface I in a manner of two-dimensionally scanning in accordance with the change of a travelling direction of the light caused by the optical deflection element M1, and an image is drawn on the drawing surface I. In this case, the image that is drawn is superposed on an image formed by the light that is transmitted through the optical reflection element M2 and reached the drawing surface I (retina). In Example 2, it is assumed that as a user's eye an aplanatic lens (not illustrated), of which focal length f=17 [mm], is disposed between the optical reflection element M2 and the drawing surface I. Thereby the light reflected on the reflection surface Mgr of the optical reflection element M2 transmits through the aplanatic lens (not illustrated) and is collected on the drawing surface I (retina).

Table 2 shows each data value of Example 2. The radius of curvature R of surface 1 to surface 14 in Table 2 correspond to symbols R1 to R14 attached to surface 1 to surface 14 in FIG. 3 (excluding surface 10 and surface 13, which are virtual surfaces).

TABLE 2

[Lens Data]

| N | R | D | nC | nd | nF | ng |
|---|---|---|---|---|---|---|
| Object surface | ∞ | ∞ | | | | |
| 1 (aperture stop) | ∞ | 7.0831 | | | | |
| 2*a | 26.1651 | 3.5000 | 1.6074 | 1.6142 | 1.6314 | 1.6463 |
| 3*a | 6.0315 | 1.2000 | | | | |
| 4*a | −143.3443 | 3.2500 | 1.5283 | 1.53113 | 1.53783 | 1.54319 |
| 5*b | −6.6594 | 1.1000 | | | | |
| 6*a*c | 6.3022 | 2.5000 | 1.5283 | 1.53113 | 1.53783 | 1.54319 |
| 7*b | 7.5704 | 20.0000 | | | | |
| 8 | 36.0000 | 1.0000 | 1.4883 | 1.4908 | 1.4969 | 1.5016 |
| 9 | 36.0000 | 1.0000 | | | | |
| 10 | ∞ | 0.0000 | | | | |
| 11*b | 98.6116 | 1.8000 | 1.4883 | 1.4908 | 1.4969 | 1.5016 |
| 12*a | 75.4656 | 0.0000 | | | | |
| 13 | ∞ | 32.0547 | | | | |
| 14*b (reflection) | −66.0000 | −38.0560 | | | | |
| Image plane (drawing surface) | ∞ | 0.0000 | | | | |

[Eccentricity Data]

| Eccentricity | Surface 8 | Surface 10 | Surface 11 | Surface 13 | Surface 14 |
|---|---|---|---|---|---|
| XDE | 0.0 | 0.0 | 0.0 | 0.0 | 0.0 |
| YDE | 0.0 | 0.0 | 0.0 | 0.0 | 0.0 |
| ZDE | 0.0 | 0.0 | 0.0 | 0.0 | 0.0 |
| ADE | 6.0 | −6.0 | 6.0 | −6.0 | 25.0 |
| BDE | 0.0 | 0.0 | 0.0 | 0.0 | 0.0 |
| CDE | 0.0 | 0.0 | 0.0 | 0.0 | 0.0 |

[Aspherical Data]

Surface 2 coefficient $k = -124.6212244263259$
$A4 = 0.001204200199273652$
$A6 = -0.0001386036941931049$
$A8 = 0.3276470962239764E-5$
$A10 = 0.8461937659182494E-7$
$A12 = -0.456637483894513E-8$ Surface 3 coefficient $k = -3.910512067211907$
$A4 = -0.0006946049400910621$
$A6 = -0.7915311306384153E-6$
$A8 = 0.563745700159402E-7$
$A10 = -0.1090170748278784E-8$
$A12 = -0.3938449383844765E-10$ Surface 4 coefficient $k = 500.0$
$A4 = 0.0001884494623314058$
$A6 = -0.6684559289524473E-6$
$A8 = -0.1661476652611027E-6$
$A10 = -0.3827111832796201E-8$
$A12 = 0.1635609710619695E-9$ Surface 6 coefficient $k = -4.1416842368152$
$A4 = 0.0002575315743116521$
$A6 = -0.1246600508478533E-4$
$A8 = 0.1934338103548995E-6$
$A10 = -0.1853239196823036E-8$
$A12 = 0.2025187349428312E-11$ Surface 12 coefficient $k = 0.00001$
$A4 = -0.2839336271869116E-4$
$A6 = -0.3408877404436407E-8$
$A8 = 0.3706976730254451E-10$
$A10 = -0.5323123873693355E-12$
$A12 = -0.1644935738227222E-13$ TABLE 2-continued

[Free-shaped surface data 1]

| Term | Surface 5 coefficient | Surface 7 coefficient |
| --- | --- | --- |
| C1(k) | −0.3044117239169427 | −6.210179649757263 |
| C4(x^2) | 0.003713914513726664 | −0.001186163413066797 |
| C5(x*y) | −0.001085562025148004 | 0.0003514837217863681 |
| C6(y^2) | 0.007062231361900973 | −0.01343277779501104 |
| C7(x^3) | −0.0002452754022695958 | 0.0003949695507289595 |
| C8(x^2*y) | −0.0001651542812559088 | −0.001361146290953931 |
| C9(x*y^2) | −0.0006135423357087519 | 0.0006365921598598023 |
| C10(y^3) | −0.0004768304415626346 | 0.0006970794286006876 |
| C11(x^4) | 0.0003037015705534265 | −0.001334625516756709 |
| C12(x^3*y^1) | 0.3809856337282187E−4 | 0.3504604790870343E−4 |
| C13(x^2*y^2) | 0.0006140546431927162 | −0.0000145364345439592 |
| C14(x^1*y^3) | 0.0001752632160152545 | −0.8191419681687872E−4 |
| C15(y^4) | 0.0003727404398809901 | −0.1736454723033816E−5 |
| C16(x^5) | 0.2719101080255722E−4 | −0.3616353217176764E−4 |
| C17(x^4*y) | 0.0001422956955870682 | 0.0002886431884463202 |
| C18(x^3*y^2) | 0.3961105934359095E−4 | −0.5288355376499949E−4 |
| C19(x^2*y^3) | 0.8362038478789313E−5 | −0.107536802370358E−4 |
| C20(x*y^4) | −0.8595236888967398E−5 | −0.3331184374513139E−5 |
| C21(y^5) | −0.9120120637233973E−5 | −0.1575072061576212E−4 |
| C22(x^6) | 0.2521499675319464E−4 | 0.0001047508559885795 |
| C23(x^5*y) | −0.9054552785237278E−5 | 0.4795226503605732E−5 |
| C24(x^4*y^2) | 0.4903665793867147E−4 | −0.4201199000129014E−5 |
| C25(x^3*y^3) | −0.2946360989471093E−5 | −0.1306822845519472E−6 |
| C26(x^2*y^4) | 0.242896687192317E−4 | −0.8600226881862653E−5 |
| C27(x*y^5) | −0.1794871126104695E−5 | 0.720051619244834E−6 |
| C28(y^6) | 0.1141762308719592E−4 | −0.3955087197324593E−5 |
| C29(x^7) | 0.3162220502466017E−5 | −0.1079263896995276E−5 |
| C30(x^6*y) | −0.1549116632015361E−4 | −0.2064262131606276E−4 |
| C31(x^5*y^2) | −0.6590678631915092E−7 | 0.2530151828630695E−5 |
| C32(x^4*y^3) | 0.1233082427792277E−6 | 0.102244563477985E−5 |
| C33(x^3*y^4) | 0.3152984712809762E−6 | 0.6674948401506242E−6 |
| C34(x^2*y^5) | 0.2104799942359669E−5 | −0.7958365434359981E−6 |
| C35(x^1*y^6) | 0.4928652007151956E−6 | −0.139646220895246E−6 |
| C36(y^7) | 0.733565522214735E−6 | 0.1479076315725485E−6 |
| C37(x^8) | −0.2310420623929306E−6 | −0.437812709225447E−5 |
| C38(x^7*y^1) | 0.4766461803638555E−7 | −0.976503668600782E−8 |
| C39(x^6*y^2) | −0.3070697697772037E−5 | −0.6778004794915314E−6 |
| C40(x^5*y^3) | −0.8736872537515536E−6 | −0.9631003457531317E−7 |
| C41(x^4*y^4) | 0.1112116510003865E−5 | 0.1960482481917686E−6 |
| C42(x^3*y^5) | 0.5315256549809658E−8 | 0.3637806089074526E−7 |
| C43(x^2*y^6) | 0.7520623414915488E−6 | 0.7870088578336839E−7 |
| C44(x^1*y^7) | −0.9210963166924476E−7 | 0.1475987111596374E−7 |
| C45(y^8) | 0.1046575213885323E−6 | 0.4549120521731493E−8 |
| C46(x^9) | −0.1984152022994444E−6 | 0.7416742079181322E−7 |
| C47(x^8*y) | 0.8128257292528562E−6 | 0.4262633477758227E−6 |
| C48(x^7*y^2) | −0.103301225933334E−6 | −0.447235130671805E−7 |
| C49(x^6*y^3) | −0.6360980963602419E−6 | 0.9194039388537242E−7 |
| C50(x^5*y^4) | 0.3748419276756708E−7 | −0.1648682975516311E−7 |
| C51(x^4*y^5) | 0.1183038351997398E−6 | −0.2294812151740892E−7 |
| C52(x^3*y^6) | −0.3907466626203889E−7 | −0.1782889075113961E−9 |
| C53(x^2*y^7) | −0.5355253376931649E−7 | 0.1244118993844718E−7 |
| C54(x*y^8) | −0.2336694636779812E−9 | 0.1663627186711565E−8 |
| C55(y^9) | −0.1393863018537273E−7 | 0.9976994048176901E−10 |
| C56(x^10) | −0.6831302926161432E−7 | 0.9762883954596809E−7 |
| C57(x^9*y) | 0.2258172909036116E−7 | −0.3306134796185684E−8 |
| C58(x^8*y^2) | 0.8968895216793801E−7 | 0.4939235647611712E−9 |
| C59(x^7*y^3) | 0.1441111681226747E−7 | 0.5877766782239647E−10 |
| C60(x^6*y^4) | 0.5511514414292549E−7 | 0.1181052120051939E−8 |
| C61(x^5*y^5) | 0.253556208676787E−7 | 0.913934362083163E−8 |
| C62(x^4*y^6) | −0.4052925742840984E−7 | −0.4377380782240374E−8 |
| C63(x^3*y^7) | 0.5625299355916163E−9 | −0.8988048665333446E−9 |
| C64(x^2*y^8) | −0.1197441617119414E−7 | −0.2051855291522901E−8 |
| C65(x^9*y) | 0.185826615354817E−8 | −0.1696631403403916E−9 |
| C66(y^10) | −0.2038458080555793E−8 | −0.6445655479796271E−10 |

[Free-shaped surface data 2]

| Term | Surface 11 coefficient |
| --- | --- |
| C1(k) | 79.46376069014747 |
| C4(x^2) | 0.008781950775443515 |
| C5(x*y) | 0.0009308419560987458 |
| C6(y^2) | 0.01113704140423572 |
| C7(x^3) | −0.1760347652094596E−4 |
| C8(x^2*y) | 0.0001460755227785545 |
| C9(x*y^2) | −0.3146182180201695E−4 |

TABLE 2-continued

| | |
|---|---|
| C10(y^3) | −0.0002338112657631998 |
| C11(x^4) | 0.0001288763886808186 |
| C12(x^3*y^1) | −0.5588537747640256E−5 |
| C13(x^2*y^2) | 0.7154476682496682E−4 |
| C14(x^1*y^3) | −0.2233413996828774E−5 |
| C15(y^4) | 0.2747947174614958E−4 |
| C16(x^5) | 0.915849258267991E−6 |
| C17(x^4*y) | −0.6148176140156556E−5 |
| C18(x^3*y^2) | 0.1375538274399082E−5 |
| C19(x^2*y^3) | −0.6233560560960316E−5 |
| C20(x*y^4) | −0.1840270598725556E−6 |
| C21(y^5) | −0.1237031224448769E−5 |
| C22(x^6) | 0.5768411537875053E−6 |
| C23(x^5*y) | −0.8034799634922124E−6 |
| C24(x^4*y^2) | 0.4293992492596523E−6 |
| C25(x^3*y^3) | 0.245074616484058E−6 |
| C26(x^2*y^4) | −0.1089178317786131E−6 |
| C27(x*y^5) | −0.2377423853387786E−6 |
| C28(y^6) | −0.1294972263368165E−6 |
| C29(x^7) | 0.6607708701685202E−11 |
| C30(x^6*y) | −0.3189630748927253E−7 |
| C31(x^5*y^2) | 0.2065713245155823E−6 |
| C32(x^4*y^3) | 0.5940891834264707E−7 |
| C33(x^3*y^4) | −0.8240175928329288E−7 |
| C34(x^2*y^5) | 0.5993826895243388E−7 |
| C35(x^1*y^6) | 0.1943252964568572E−7 |
| C36(y^7) | 0.3771743748042609E−7 |
| C37(x^8) | −0.482034159810021E−7 |
| C38(x^7*y^1) | −0.3199313441251986E−7 |
| C39(x^6*y^2) | 0.8520322345961256E−7 |
| C40(x^5*y^3) | 0.2216481706184415E−7 |
| C41(x^4*y^4) | −0.7848660775257326E−7 |
| C42(x^3*y^5) | −0.1306460670991727E−8 |
| C43(x^2*y^6) | −0.6436299557475001E−9 |
| C44(x^1*y^7) | 0.192000600061975E−8 |
| C45(y^8) | 0.2171472696133448E−9 |

[Free-shaped surface data 3]

| Term | Surface 14 coefficient |
|---|---|
| C1(k) | 4.331113639069206 |
| C4(x^2) | −0.0009066565006826442 |
| C5(x*y) | 0.9422610759795473E−5 |
| C6(y^2) | 0.00142035683124462 |
| C7(x^3) | −0.5006378989079557E−5 |
| C8(x^2*y) | 0.1279911190810272E−4 |
| C9(x*y^2) | 0.1483714442744794E−4 |
| C10(y^3) | −0.2263724302742891E−4 |
| C11(x^4) | 0.4885153890283033E−4 |
| C12(x^3*y^1) | 0.8907390616195318E−6 |
| C13(x^2*y^2) | −0.1306776632445698E−4 |
| C14(x^1*y^3) | −0.1678420737545771E−5 |
| C15(y^4) | −0.8026685702591208E−5 |
| C16(x^5) | 0.2442034237925676E−6 |
| C17(x^4*y) | 0.3108842124348334E−5 |
| C18(x^3*y^2) | −0.2726854812902458E−6 |
| C19(x^2*y^3) | −0.1255872948855557E−5 |
| C20(x*y^4) | −0.1493676576993912E−6 |
| C21(y^5) | 0.1058325108957716E−6 |
| C22(x^6) | −0.260984451952067E−5 |
| C23(x^5*y) | −0.3725459143092297E−7 |
| C24(x^4*y^2) | 0.6144438515964853E−6 |
| C25(x^3*y^3) | 0.5427620822882202E−8 |
| C26(x^2*y^4) | −0.2992722123534214E−9 |
| C27(x*y^5) | 0.1088633717848592E−7 |
| C28(y^6) | 0.1242491189436026E−7 |
| C29(x^7) | −0.1095787164100878E−7 |
| C30(x^6*y) | −0.2968894475677224E−6 |
| C31(x^5*y^2) | 0.1194535303878235E−7 |
| C32(x^4*y^3) | 0.1960863391147454E−7 |
| C33(x^3*y^4) | −0.1157330225815343E−8 |
| C34(x^2*y^5) | 0.3349277461157255E−7 |
| C35(x^1*y^6) | 0.1107075191076766E−9 |
| C36(y^7) | 0.2033353596333252E−8 |
| C37(x^8) | 0.7057980834653433E−7 |
| C38(x^7*y^1) | −0.3663006846702143E−8 |
| C39(x^6*y^2) | −0.1601758454201476E−7 |
| C40(x^5*y^3) | 0.1825926824770061E−8 |
| C41(x^4*y^4) | 0.8690484051603E−8 |

TABLE 2-continued

| Term | Coefficient |
|---|---|
| C42($x^3*y^5$) | 0.4154060781671823E−10 |
| C43($x^2*y^6$) | −0.1038979444268852E−9 |
| C44($x^1*y^7$) | 0.1652454713668999E−9 |
| C45($y^8$) | 0.7724559355566372E−9 |
| C46($x^9$) | 0.154408908057191E−9 |
| C47($x^8*y$) | 0.5699847320152124E−8 |
| C48($x^7*y^2$) | 0.4332746877460881E−10 |
| C49($x^6*y^3$) | −0.1277325470506736E−8 |
| C50($x^5*y^4$) | 0.1759993562231055E−9 |
| C51($x^4*y^5$) | 0.209641652630629E−9 |
| C52($x^3*y^6$) | −0.831181352914488E−10 |
| C53($x^2*y^7$) | −0.3870336258447297E−9 |
| C54($x*y^8$) | 0.3503243314912144E−10 |
| C55($y^9$) | −0.3238934302039904E−10 |
| C56($x^10$) | −0.8249139063163544E−9 |
| C57($x^9*y$) | 0.9829216038217835E−10 |
| C58($x^8*y^2$) | 0.2927583539831702E−9 |
| C59($x^7*y^3$) | −0.5842996838838534E−10 |
| C60($x^6*y^4$) | −0.5512513899861672E−10 |
| C61($x^5*y^5$) | −0.8905989254150218E−11 |
| C62($x^4*y^6$) | −0.8613607998148935E−10 |
| C63($x^3*y^7$) | 0.6496157888087305E−11 |
| C64($x^2*y^8$) | 0.3117619545237941E−10 |
| C65($x^9*y$) | −0.4381187587446189E−11 |
| C66($y^10$) | −0.2861260928939042E−11 |

[Diffraction optical surface data]

| Term | Surface 6 coefficient |
|---|---|
| C3($x^2$) | −0.5078981020003178E−4 |
| C4($x*y$) | −0.1074272792154444E−4 |
| C5($y^2$) | −0.0001013950360598153 |
| C6($x^3$) | 0.7393093289878994E−5 |
| C7($x^2*y$) | 0.1082909716426623E−4 |
| C8($x*y^2$) | 0.1687515783535323E−5 |
| C9($y^3$) | 0.508045964678955E−5 |
| C10($x^4$) | −0.6002724002574973E−5 |
| C11($x^3*y^1$) | −0.1011785033518255E−6 |
| C12($x^2*y^2$) | 0.8967362674962745E−5 |
| C13($x^1*y^3$) | −0.7150890228122288E−6 |
| C14($y^4$) | 0.1884605645421943E−5 |
| C15($x^5$) | 0.7496012489836572E−7 |
| C16($x^4*y$) | −0.4478856492315672E−6 |
| C17($x^3*y^2$) | −0.6108732769621659E−7 |
| C18($x^2*y^3$) | −0.203867515925772E−7 |
| C19($x*y^4$) | 0.2137699921080692E−7 |
| C20($y^5$) | 0.9636626970058547E−8 |
| C21($x^6$) | −0.7390577981553802E−7 |
| C22($x^5*y$) | 0.1652236605672853E−7 |
| C23($x^4*y^2$) | 0.182216819275834E−6 |
| C24($x^3*y^3$) | −0.1350514661675573E−7 |
| C25($x^2*y^4$) | 0.1528045758514017E−6 |
| C26($x*y^5$) | 0.4953482058318769E−8 |
| C27($y^6$) | 0.1477315812746981E−7 |
| C28($x^7$) | −0.1967457563220266E−7 |
| C29($x^6*y$) | 0.536866450738596E−7 |
| C30($x^5*y^2$) | −0.2462938966361094E−8 |
| C31($x^4*y^3$) | −0.3064619953760897E−7 |
| C32($x^3*y^4$) | −0.3688442580226221E−8 |
| C33($x^2*y^5$) | 0.9203883957108073E−9 |
| C34($x^1*y^6$) | 0.1973056856945383E−9 |
| C35($y^7$) | 0.3414723247599195E−9 |
| C36($x^8$) | 0.7192992299042694E−8 |
| C37($x^7*y^1$) | 0.8111634641150032E−9 |
| C38($x^6*y^2$) | 0.7033907675889344E−8 |
| C39($x^5*y^3$) | 0.5099463925355792E−10 |
| C40($x^4*y^4$) | 0.2606463011316836E−9 |
| C41($x^3*y^5$) | 0.4485956930629984E−9 |
| C42($x^2*y^6$) | −0.3351715768272032E−9 |
| C43($x^1*y^7$) | −0.7088549439987446E−10 |
| C44($y^8$) | 0.7474213547085642E−10 |
| C45($x^9$) | −0.7056671272072184E−9 |
| C46($x^8*y$) | 0.4176104169126524E−8 |
| C47($x^7*y^2$) | 0.6901507491686979E−9 |
| C48($x^6*y^3$) | 0.1707244701705906E−8 |
| C49($x^5*y^4$) | −0.1043681567188657E−9 |
| C50($x^4*y^5$) | −0.3868465931158265E−9 |
| C51($x^3*y^6$) | −0.1769864426701496E−9 |
| C52($x^2*y^7$) | −0.2904749839197674E−9 |

TABLE 2-continued

| | |
|---|---|
| C53(x*y^8) | 0.5167553024223719E−10 |
| C54(y^9) | 0.8669348988349122E−11 |
| C55(x^10) | 0.3948617721101432E−9 |
| C56(x^9*y) | −0.4701321313712419E−10 |
| C57(x^8*y^2) | 0.5980309265501623E−10 |
| C58(x^7*y^3) | 0.7984092689910972E−10 |
| C59(x^6*y^4) | −0.2942608881005636E−9 |
| C60(x^5*y^5) | 0.171946598084867E−10 |
| C61(x^4*y^6) | −0.2126547520189481E−9 |
| C62(x^3*y^7) | 0.3294818039868844E−10 |
| C63(x^2*y^8) | −0.7937250427695667E−10 |
| C64(x^9*y) | −0.9445603210003383E−11 |
| C65(y^10) | −0.7447027309736033E−11 |

Figure 4:
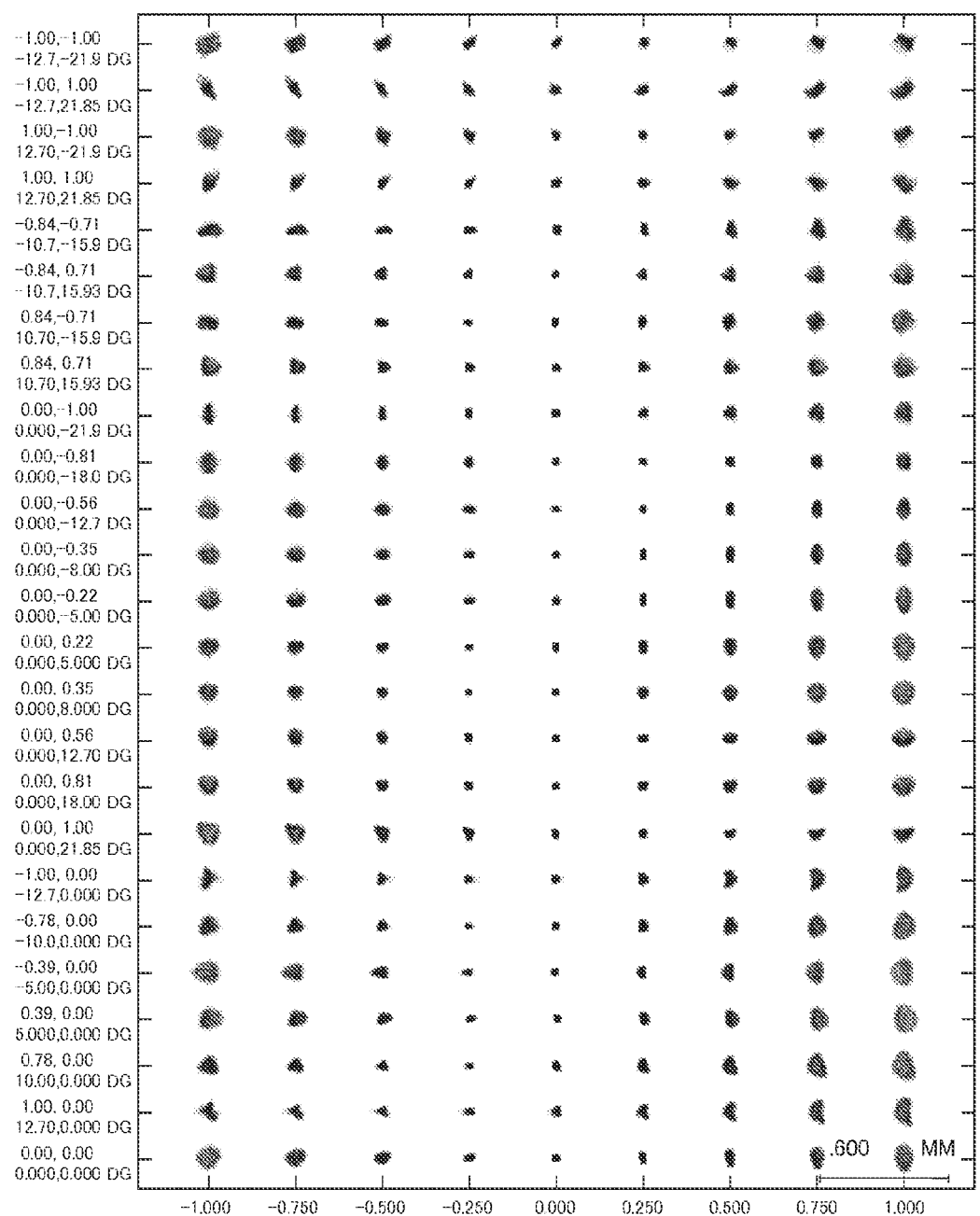
FIG. 4 is a spot diagram of a head-mounted display optical system according to Example 2.

FIG. 4 is a spot diagram of the head-mounted display optical system LS2 according to Example 2. As FIG. 4 shows, according to Example 2, chromatic aberration is corrected satisfactorily, and excellent image forming performance is demonstrated.

Example 3

Figure 5:
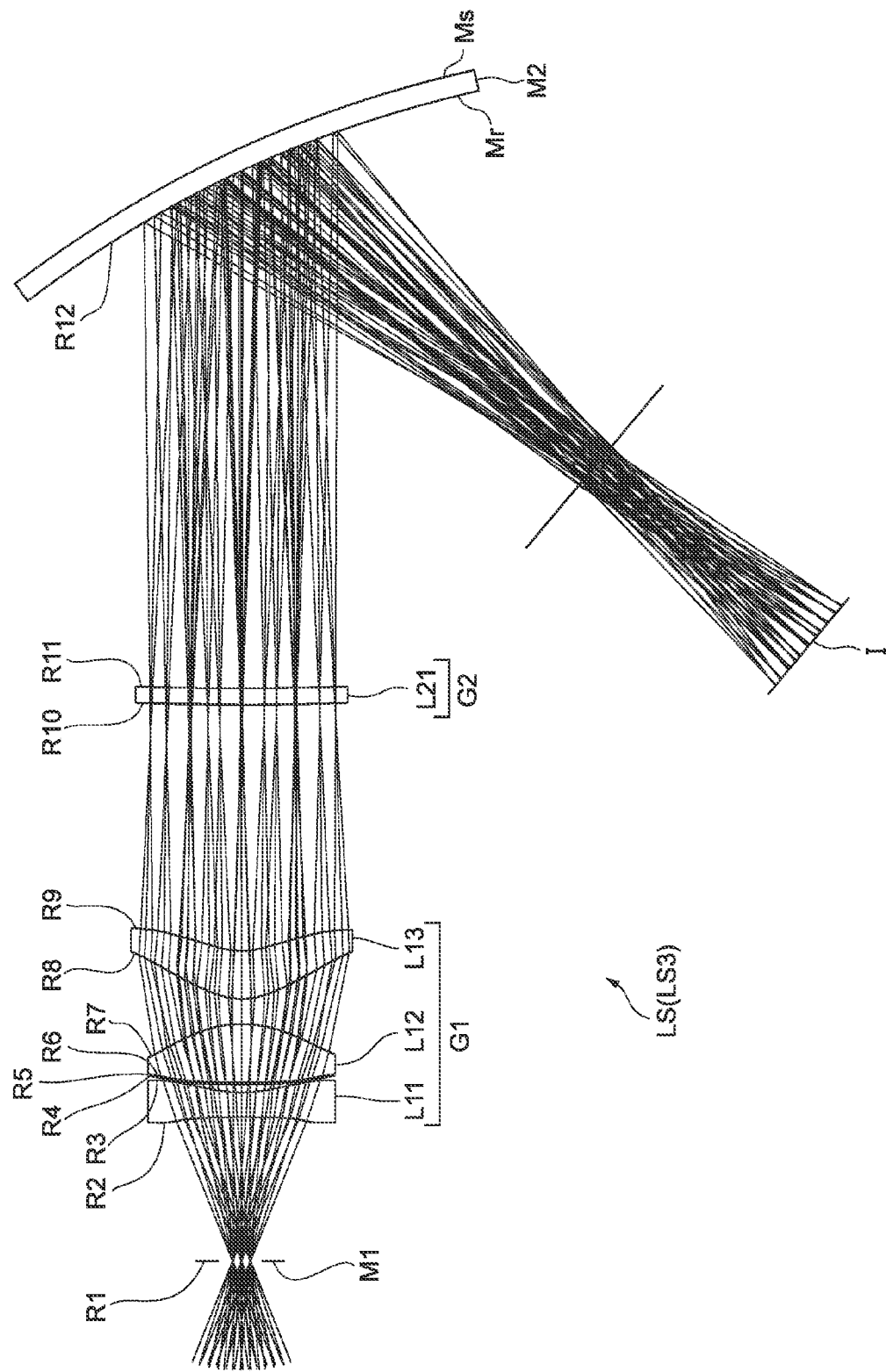
FIG. 5 is an optical path diagram of a head-mounted display optical system according to Example 3.

Example 3 of the present invention will be described next with reference to FIG. 5, FIG. 6 and Table 3. FIG. 5 is an optical path diagram of a head-mounted display optical system LS (LS3) according to Example 3. The head-mounted display optical system LS3 according to Example 3 has, in order from a light source, an optical deflection element M1, a first lens group G1 having positive refractive power, a second lens group G2 having negative refractive power near the reference axis, and an optical reflection element M2. The optical deflection element M1 changes the traveling direction of a light from the light source (e.g. approximately parallel light, such as laser light and LED light). In FIG. 5, the state of change of the traveling direction of light in the optical deflection element M1 is indicated by the light that transmits through a diaphragm (this diaphragm is indicated as the optical deflection element M1) at a plurality of types of incident angles, to simplify description.

The first lens group G1 collects light entered from the light source via the optical deflection element M1. The first lens group G1 includes, in order from the light source, a negative lens L11, a first free-shaped surface lens L12 having positive refractive power, and a second free-shaped surface lens L13 having positive refractive power. The negative lens L11 is formed in a biconcave. An aspherical surface, which is rotationally symmetrical with respect to the reference axis, is formed on both lens surfaces of the negative lens L11. The first free-shaped surface lens L12 is formed in a biconvex shape. An aspherical surface, which is rotationally symmetrical with respect to the reference axis, and a diffraction optical surface are formed on the light source side lens surface of the first free-shaped surface lens L12, and a free-shaped surface, which is rotationally asymmetrical with respect to the reference axis, is formed on the drawing surface I side lens surface of the first free-shaped surface lens L12. The second free-shaped surface lens L13 is formed in a meniscus shape having a convex surface facing the light source. An aspherical surface, which is rotationally symmetrical with respect to the reference axis, is formed on the light source side lens surface of the second free-shaped surface lens L13, and a free-shaped surface, which is rotationally asymmetrical with respect to the reference axis, is formed on the drawing surface I side lens surface of the second free-shaped surface lens L13.

The second lens group G2 is disposed near an intermediate image forming position (collecting position) by the first lens group G1. The second lens group G2 includes a diffusion lens L21 having negative refractive power. The diffusion lens L21 is formed in a meniscus shape having a convex surface facing the light source. A diffuse transmission surface is formed on the light source side lens surface of the diffusion lens L21.

The optical reflection element M2 has a reflection surface M2r that reflects light transmitted through the second lens group G2. The optical reflection element M2 is also configured to transmit the light entered from the surface M2s on the opposite side of the reflection surface M2r. The reflection surface M2r of the optical reflection element M2 is formed to be rotationally asymmetrical with respect to the reference axis.

This head-mounted display optical system LS is configured such that light from the light source, which is reflected on the reflection surface M2r of the optical reflection element M2 and reaches a surface assumed to be located on a retina when the user wears the head-mounted display (drawing surface I), moves on the drawing surface I in a manner of two-dimensionally scanning in accordance with the change of a travelling direction of the light caused by the optical deflection element M1, and an image is drawn on the drawing surface I. In this case, the image that is drawn is superposed on an image formed by the light that is transmitted through the optical reflection element M2 and reached the drawing surface I (retina). In Example 3, it is assumed that as a user's eye an aplanatic lens (not illustrated), of which focal length f=17 [mm], is disposed between the optical reflection element M2 and the drawing surface I. Thereby the light reflected on the reflection surface Mgr of the optical reflection element M2 transmits through the aplanatic lens (not illustrated) and is collected on the drawing surface I (retina).

Table 3 shows each data value of Example 3. The radius of curvature R of surface 1 to surface 12 in Table 3 correspond to symbols R1 to R12 attached to surface 1 to surface 12 in FIG. 5.

TABLE 3

| [Lens Data] | | | | | | |
|---|---|---|---|---|---|---|
| N | R | D | nC | nd | nF | ng |
| Object surface | ∞ | ∞ | | | | |
| 1 (aperture stop) | ∞ | 8.7664 | | | | |
| 2*a | −55.2558 | 1.5000 | 1.6074 | 1.6142 | 1.6314 | 1.6463 |
| 3*a | 7.4777 | 0.5000 | | | | |
| 4*a | 79.0243 | 0.0500 | 1.5538 | 1.5571 | 1.565 | 1.5713 |
| 5*a*c | 79.0243 | 0.0500 | 1.5233 | 1.5278 | 1.5391 | 1.5491 |
| 6*a | 79.0243 | 3.5620 | 1.5283 | 1.53113 | 1.53783 | 1.54319 |
| 7*b | −6.5189 | 1.5117 | | | | |
| 8*a | 3.5334 | 2.9263 | 1.5283 | 1.53113 | 1.53783 | 1.54319 |
| 9*b | 3.0785 | 15.0000 | | | | |
| 10 | 200.0000 | 1.0000 | 1.5283 | 1.53113 | 1.53783 | 1.54319 |
| 11 | 197.0000 | 31.5000 | | | | |
| 12*b (reflection) | −66.0000 | −45.0000 | | | | |
| Image plane (drawing surface) | ∞ | 0.0000 | | | | |

| [Eccentricity Data] | |
|---|---|
| Eccentricity | Surface 12 |
| XDE | 0.0 |
| YDE | 0.0 |
| ZDE | 0.0 |
| ADE | 25.0 |
| BDE | 0.0 |
| CDE | 0.0 |

[Aspherical Data]

Surface 2 coefficient k = 61.53223377503105
A4 = 0.001117233798974202
A6 = −0.0001507028920918782
A8 = 0.2126725352871772E−5
A10 = 0.91093073607483E−7

Surface 3 coefficient k = −6.67720051575926
A4 = −0.0007382034101680365
A6 = 0.1602347044190949E−6
A8 = 0.1185673617018457E−6
A10 = −0.9483890402222131E−9

Surface 4 coefficient k = 175.71268632111
A4 = 0.000381528250257577
A6 = 0.361449829130996E−5
A8 = −0.107558931083213E−6
A10 = −0.542103130739954E−8

Surface 5 coefficient k = 175.71268632111
A4 = 0.000381528250257577
A6 = 0.361449829130996E−5
A8 = −0.107558931083213E−6
A10 = −0.542103130739954E−8

Surface 6 coefficient k = 175.7126863211099
A4 = 0.0003815282502575771
A6 = 0.3614498291309964E−5
A8 = −0.107558931083213E−6
A10 = −0.542103130739954E−8

Surface 8 coefficient k = −3.816528789284875
A4 = 0.0002997589906375087
A6 = −0.1152321916657979E−4
A8 = 0.1969329274360649E−6
A10 = −0.2182880862990949E−8

TABLE 3-continued

[Free-shaped surface data 1]

| Term | Surface 7 coefficient |
| --- | --- |
| C1(k) | −0.3364628619636353 |
| C4(x^2) | 0.001111389809964225 |
| C5(x*y) | −0.000345633023972219 |
| C6(y^2) | 0.004957826540583992 |
| C7(x^3) | −0.8403950712470563E−4 |
| C8(x^2*y) | −0.0006334087154299026 |
| C9(x*y^2) | −0.155374355054229E−4 |
| C10(y^3) | −0.0005245756359215623 |
| C11(x^4) | 0.000372141838784073 |
| C12(x^3*y^1) | −0.1864744397607962E−4 |
| C13(x^2*y^2) | 0.0006595063497386374 |
| C14(x^1*y^3) | −0.2069965720960925E−5 |
| C15(y^4) | 0.000379609866359328 |
| C16(x^5) | 0.3837475529663155E−5 |
| C17(x^4*y) | 0.199909940626342E−4 |
| C18(x^3*y^2) | 0.4632702136050437E−4 |
| C19(x^2*y^3) | −0.0001344231633986514 |
| C20(x*y^4) | −0.1076425114314026E−5 |
| C21(y^5) | −0.3079658423187322E−5 |
| C22(x^6) | −0.4824012296215599E−6 |
| C23(x^5*y) | −0.6811033610542694E−5 |
| C24(x^4*y^2) | 0.3487930519274964E−4 |
| C25(x^3*y^3) | 0.778306442825551E−6 |
| C26(x^2*y^4) | 0.2776544560849299E−4 |
| C27(x*y^5) | 0.9497638333389676E−6 |
| C28(y^6) | 0.6709065015909173E−5 |
| C29(x^7) | 0.6358093464635089E−7 |
| C30(x^6*y) | 0.2246824033003574E−5 |
| C31(x^5*y^2) | −0.2184062792257402E−5 |
| C32(x^4*y^3) | 0.3159897962061326E−5 |
| C33(x^3*y^4) | −0.1529397930536397E−5 |
| C34(x^2*y^5) | 0.6616515291670437E−5 |
| C35(x^1*y^6) | −0.5053653164983818E−7 |
| C36(y^7) | 0.5100339662302451E−7 |
| C37(x^8) | 0.3908927771969818E−6 |
| C38(x^7*y^41) | 0.2295527350587795E−6 |
| C39(x^6*y^2) | −0.1300101306420439E−5 |
| C40(x^5*y^3) | −0.413292876878701E−7 |
| C41(x^4*y^4) | 0.1311082815847791E−5 |
| C42(x^3*y^5) | 0.2816190918246684E−8 |
| C43(x^2*y^6) | 0.1210284265050765E−5 |
| C44(x^1*y^7) | −0.2591395975591261E−7 |
| C45(y^8) | 0.1606482713875591E−6 |

[Free-shaped surface data 2]

| Term | Surface 9 coefficient |
| --- | --- |
| C1(k) | −6.77657355626851 |
| C4(x^2) | −0.002128358710400415 |
| C5(x*y) | 0.0006211529504435977 |
| C6(y^2) | −0.0146857471219256 |
| C7(x^3) | 0.0001607450550941153 |
| C8(x^2*y) | −0.001049920702896136 |
| C9(x*y^2) | −0.5339830460557105E−4 |
| C10(y^3) | 0.0003155842783092288 |
| C11(x^4) | −0.001471833409422146 |
| C12(x^3*y^1) | 0.0001080632917351919 |
| C13(x^2*y^2) | −0.0001421361868672432 |
| C14(x^1*y^3) | −0.1161179724972522E−4 |
| C15(y^4) | 0.4298830280866484E−5 |
| C16(x^5) | −0.3925938275569645E−5 |
| C17(x^4*y) | 0.0003800481494676694 |
| C18(x^3*y^2) | −0.2954850672310948E−4 |
| C19(x^2*y^3) | −0.3788310072687263E−4 |
| C20(x*y^4) | 0.5997479309307839E−5 |
| C21(y^5) | −0.7168907711651808E−5 |
| C22(x^6) | 0.0001225000133339481 |
| C23(x^5*y) | 0.2113946080473899E−5 |
| C24(x^4*y^2) | 0.8148380209039854E−5 |
| C25(x^3*y^3) | −0.1095105430202548E−5 |
| C26(x^2*y^4) | −0.256688443064381E−4 |
| C27(x*y^5) | 0.5505210595164379E−7 |
| C28(y^6) | −0.339586840784051E−5 |
| C29(x^7) | −0.2820684838114497E−6 |
| C30(x^6*y) | −0.2009020233590986E−4 |

TABLE 3-continued

| | |
|---|---|
| C31(x^5*y^2) | 0.1227092916159645E-5 |
| C32(x^4*y^3) | 0.4568725315420399E-5 |
| C33(x^3*y^4) | 0.6426244168301948E-6 |
| C34(x^2*y^5) | −0.156702271184445E-5 |
| C35(x^1*y^6) | −0.7630426422037567E-7 |
| C36(y^7) | 0.1355347911491596E-6 |
| C37(x^8) | −0.3608217232904656E-5 |

[Free-shaped surface data 3]

| Term | Surface 12 coefficient |
|---|---|
| C1(k) | −4.0 |
| C4(x^2) | −0.0020593819522202 |
| C7(x^3) | 0.2511626120412692E-5 |
| C11(x^4) | 0.4430092334334631E-4 |
| C16(x^5) | 0.2499682762769764E-6 |
| C22(x^6) | −0.2488002816824596E-5 |
| C29(x^7) | −0.1183737952292583E-7 |
| C37(x^8) | 0.6958708070498757E-7 |
| C46(x^9) | 0.3912166160352333E-9 |
| C56(x^10) | −0.9268050242165196E-9 |

[Diffraction optical surface data]

| Term | Surface 5 coefficient |
|---|---|
| C1(x) | 0.000186432913712339 |
| C2(y) | −0.000334028384455803 |
| C3(x^2) | −0.000400706036884263 |
| C4(x*y) | 0.221926248104121E-4 |
| C5(y^2) | −0.0005496459597546 |
| C6(x^3) | 0.657292046059681E-5 |
| C7(x^2*y) | 0.6278671042198401E-5 |
| C8(x*y^2) | 0.8636794643805789E-5 |
| C9(y^3) | 0.473536699269363E-5 |
| C10(x^4) | 0.249196177587225E-4 |
| C11(x^3*y^1) | 0.4470566188511271E-5 |
| C12(x^2*y^2) | 0.5660848502605312E-4 |
| C13(x^1*y^3) | −0.9879118046431838E-6 |
| C14(y^4) | 0.22869493158194E-4 |
| C15(x^5) | −0.282604520614315E-5 |
| C16(x^4*y) | −0.138087340623321E-4 |
| C17(x^3*y^2) | −0.357200792044669E-5 |
| C18(x^2*y^3) | 0.4306011297920189E-5 |
| C19(x*y^4) | −0.168874973117509E-5 |
| C20(y^5) | −0.131812119121683E-5 |
| C21(x^6) | −0.111836888819939E-5 |
| C22(x^5*y) | 0.536585886344322E-6 |
| C23(x^4*y^2) | −0.6205464353723851E-5 |
| C24(x^3*y^3) | 0.171843584946866E-6 |
| C25(x^2*y^4) | −0.240213149514409E-5 |
| C26(x*y^5) | 0.597793502065084E-7 |
| C27(y^6) | −0.444618149861892E-7 |
| C28(x^7) | −0.898537554431373E-9 |
| C29(x^6*y) | 0.270211057167523E-5 |
| C30(x^5*y^2) | 0.227481948957823E-6 |
| C31(x^4*y^3) | −0.181802535043457E-5 |
| C32(x^3*y^4) | 0.200702230224553E-7 |
| C33(x^2*y^5) | 0.663005133632598E-6 |
| C34(x^1*y^6) | 0.6982200936000581E-7 |
| C35(y^7) | 0.612245076412055E-7 |
| C36(x^8) | 0.350655378073152E-6 |
| C37(x^7*y^1) | −0.106574777334788E-6 |
| C38(x^6*y^2) | 0.6632704708545499E-6 |
| C39(x^5*y^3) | −0.111237522680437E-8 |
| C40(x^4*y^4) | −0.188163478389313E-6 |
| C41(x^3*y^5) | −0.821421390471722E-7 |
| C42(x^2*y^6) | 0.100809875031883E-6 |
| C43(x^1*y^7) | 0.111306164297601E-9 |
| C44(y^8) | −0.220079301279993E-7 |

Figure 6:
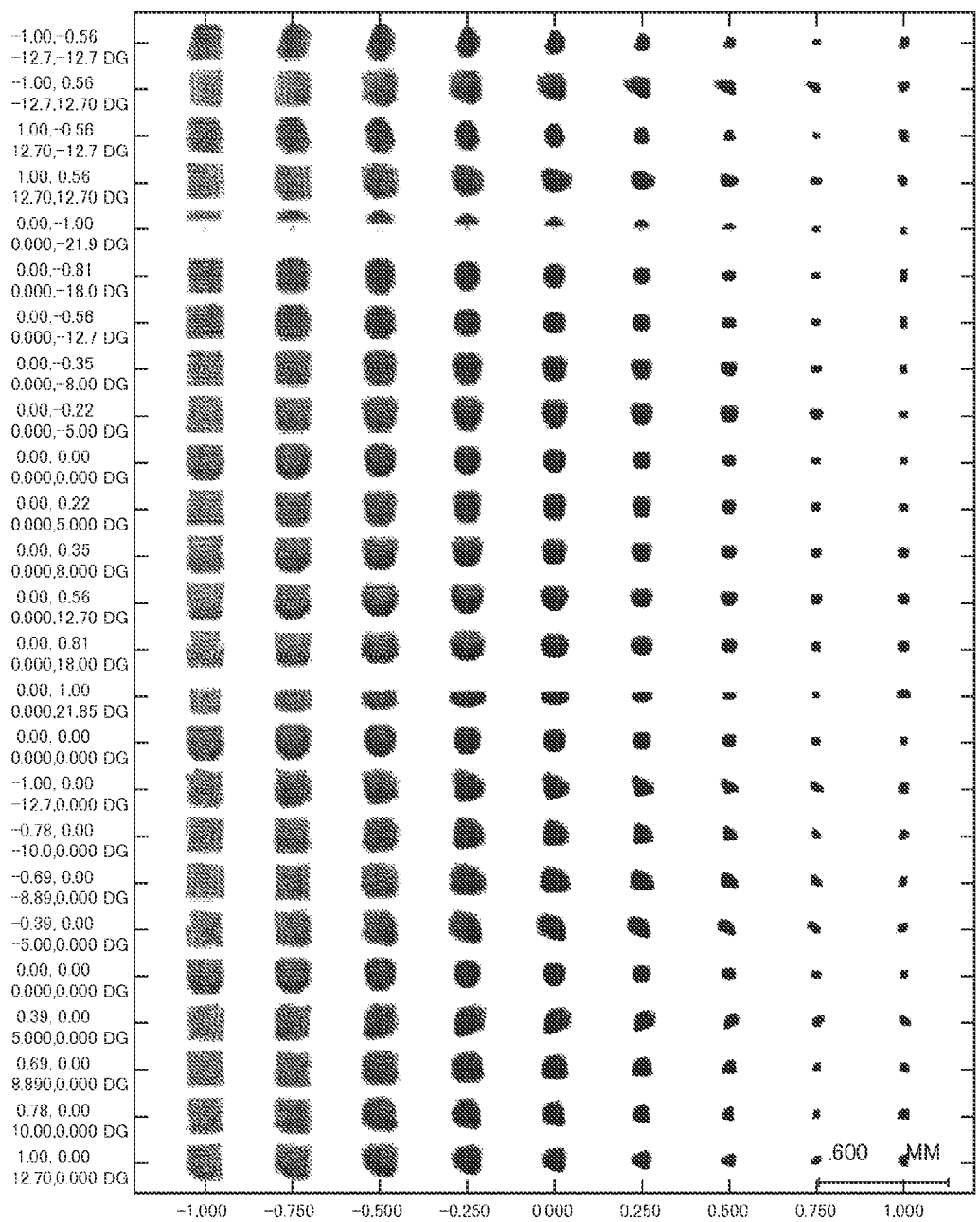
FIG. 6 is a spot diagram of a head-mounted display optical system according to Example 3.

FIG. 6 is a spot diagram of the head-mounted display optical system LS3 according to Example 3. As FIG. 6 shows, according to Example 3, chromatic aberration is corrected satisfactorily, and excellent image forming performance is demonstrated.

Table 4 shows conditional expression correspondence values in each example.

TABLE 4

| [Basic Data] | Example 1 | Example 2 | Example 3 |
|---|---|---|---|
| f1 | 20.2574 | 20.3887 | 17.797 |
| f2 | −1311.24 | −741.839 | −27960.2 |
| fd | — | 41.8669 | 11.4242 |
| d1 | — | — | 0.05 |
| d2 | — | — | 0.05 |
| fm | 33.0 | 33.0 | 33.0 |
| dm | 31.1429 | 32.0547 | 31.5 |
| Ndh | — | — | 1.5571 |
| Ndl | — | — | 1.5278 |

| [Conditional expression correspondence value] | | Example 1 | Example 2 | Example 3 |
|---|---|---|---|---|
| Conditional expression (1) | m = | 0.60355 | 0.60755 | 0.53834 |
| Conditional expression (2) | \|f2/f1\| = (−f2)/f1 = | 64.729 | 36.385 | 1571.06 |
| Conditional expression (3) | \|1/f2\| = 1/(−f2) = | 0.000763 | 0.001348 | 0.000036 [mm$^{-1}$] |
| Conditional expression (4) | Δvd = | 30.1 | 30.1 | 30.1 |
| Conditional expression (5) | fd/f1 = | — | 2.0534 | 0.64192 |
| Conditional expression (6) | dm/(fm)$^2$ = | 0.0286 | 0.0294 | 0.02893 [mm$^{-1}$] |
| Conditional expression (7) | Ndh − Ndl = | — | — | 0.0293 |
| Conditional expression (8) | (d1 + d2)/f1 = | — | — | 0.00562 |

As shown above, each of the conditional expressions is satisfied in each example. According to each example, compactness, light weight and excellent optical performance can be implemented.

EXPLANATION OF NUMERALS AND CHARACTERS

DSP head-mounted display
LS head-mounted display optical system
G1 first lens group
G2 second lens group
M1 optical deflection element
M2 optical reflection element (M2r reflection surface)

The invention claimed is:

1. A head-mounted display optical system, comprising:
an optical deflection element that changes a travelling direction of light from a light source;
a first lens group that has positive refractive power and collects light entered via the optical deflection element;
a second lens group that is disposed near a position of intermediate image forming by the first lens group; and
an optical reflection element that has a reflection surface to reflect light transmitted through the second lens group, and allows light, entered from an opposite surface to the reflection surface, to transmit therethrough,
the head-mounted display optical system being configured such that light from the light source, which is reflected on the reflection surface and reaches a drawing surface assumed to be located on a retina when a user wears the head-mounted display, moves on the drawing surface in accordance with the change of a travelling direction of the light caused by the optical deflection element, and an image is drawn on the drawing surface,
the first lens group including a free-shaped surface lens having a free-shaped surface which is rotationally asymmetrical with respect to a reference axis,
the reflection surface of the optical reflection element being formed to be rotationally asymmetrical with respect to a reference axis, and
the following conditional expressions being satisfied:

$$0.20 < m < 3.00$$

$$20 < |f2/f1| < 3000$$

where m denotes an afocal magnification of the head-mounted display optical system, f1 denotes a focal length of the first lens group, and f2 denotes a focal length of the second lens group.

2. The head-mounted display optical system according to claim 1, wherein the following conditional expression is satisfied:

$$0.000015[\text{mm}^{-1}] < |1/f2| < 0.005[\text{mm}^{-1}].$$

3. The head-mounted display optical system according to claim 1, wherein the following conditional expression is satisfied:

$$15 < \Delta vd < 45$$

where Δvd denotes a maximum value of a difference of Abbe numbers between a lens having positive refractive power and a lens having negative refractive power in a the first lens group.

4. The head-mounted display optical system according to claim 1, wherein
the first lens group is constituted by resin lenses,
the second lens group further includes a lens having a diffuse transmission surface, and
a deflection angle of light that is reflected on the reflection surface of the optical reflection element is 45° or more.

5. The head-mounted display optical system according to claim 1, wherein
the first lens group includes the free-shaped surface lens having positive refractive power and a negative lens, and
the second lens group includes a free-shaped surface lens having a free-shaped surface which is rotationally asymmetrical with respect to a reference axis.

6. The head-mounted display optical system according to claim 5, wherein the second lens group has negative refractive power near the reference axis.

7. The head-mounted display optical system according to claim 5, wherein
the free-shaped surface lens of the first lens group has the free-shaped lens surface and a lens surface located on the opposite side of this lens surface and rotationally symmetrical with respect to a reference axis, and is formed in a meniscus shape,
the negative lens has a lens surface rotationally asymmetrical with respect to a reference axis, and is formed in a meniscus shape, and
the free-shaped surface lens of the second lens group has positive refractive power and is formed in a meniscus shape.

8. The head-mounted display optical system according to claim 7, wherein
when (x, y) are the coordinates that pass through an intersection point of the free-shaped lens surface and a reference axis and are on a plane perpendicular to the reference axis, and a sag of the free-shaped lens surface is expressed by a polynomial of x and y in the free-shaped surface lens of the first lens group, the polynomial of x and y includes a term, of which degree is at least 8, and
when h is a distance from the reference axis and a sag of the aspherical lens surface is expressed by a polynomial of h in the free-shaped surface lens of the first lens group, the polynomial of h includes a term, of which degree is at least 8.

9. The head-mounted display optical system according to claim 7, wherein
the second lens group further includes a lens having a diffuse transmission surface, and
when (x, y) are coordinates that pass through an intersection point of the free-shaped lens surface and a reference axis and are on a plane perpendicular to the reference axis, and a sag of the free-shaped lens surface is expressed by a polynomial of x and y in the free-shaped surface lens of the second lens group, the polynomial of x and y includes a term, of which degree is at least 8.

10. The head-mounted display optical system according to claim 1, wherein
the first lens group includes a lens having a diffraction optical surface, and
the following conditional expression is satisfied:

$$0.01 < fd/f1 < 10.00$$

where fd denotes a focal length of the lens having the diffraction optical surface, and f1 denotes a focal length of the first lens group.

11. The head-mounted display optical system according to claim 1, wherein
the image that is drawn is superposed on an image formed by the light that has transmitted through the optical reflection element and reached the drawing surface.

12. A head-mounted display including the head-mounted display optical system according to claim 1.

* * * * *